United States Patent
Hepburn et al.

(10) Patent No.: US 8,341,947 B2
(45) Date of Patent: Jan. 1, 2013

(54) SYSTEM AND METHOD FOR REGENERATING A PARTICULATE FILTER

(75) Inventors: Jeffrey Scott Hepburn, Birmingham, MI (US); David Karl Bidner, Livonia, MI (US); Helmut Hans Ruhland, Eschweiler (DE); Moritz Klaus Springer, Hagen (DE); Thomas Lorenz, Cologne (DE); Georg Louven, Neuwied (DE); Carolyn Parks Hubbard, Canton, MI (US); Robert Walter McCabe, Novi, MI (US); Eva Thanasiu, Trenton, MI (US); James Michael Kerns, Trenton, MI (US); Nian Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 12/638,533

(22) Filed: Dec. 15, 2009

(65) Prior Publication Data
US 2011/0072784 A1 Mar. 31, 2011

Related U.S. Application Data

(60) Provisional application No. 61/246,939, filed on Sep. 29, 2009.

(51) Int. Cl.
*F01N 3/00* (2006.01)
(52) U.S. Cl. ............ 60/297; 60/274; 60/285; 60/295
(58) Field of Classification Search ............ 60/274, 60/278, 280, 286, 295, 297, 301, 311
See application file for complete search history.

(56) References Cited

U.S. PATENT DOCUMENTS

| | | | |
|---|---|---|---|
| 6,738,702 B2 | 5/2004 | Kolmanovsky et al. | |
| 7,062,904 B1 | 6/2006 | Hu et al. | |
| 7,299,626 B2 | 11/2007 | Barasa et al. | |
| 7,482,303 B2 | 1/2009 | Bosteels | |
| 7,506,504 B2 * | 3/2009 | Kumar | 60/299 |
| 8,005,605 B2 * | 8/2011 | Yasui | 701/109 |
| 8,037,674 B2 * | 10/2011 | Kupe et al. | 60/286 |
| 2005/0019578 A1 | 1/2005 | Bosteels | |
| 2006/0179825 A1 | 8/2006 | Hu et al. | |
| 2007/0220873 A1 | 9/2007 | Bosteels | |
| 2009/0120071 A1 | 5/2009 | Gandhi et al. | |

(Continued)

FOREIGN PATENT DOCUMENTS

EP 0952323 10/1999

(Continued)

OTHER PUBLICATIONS

Hepburn, Jeffrey S. et al., "System and Method for Regenerating a Particulate Filter Accompanied by a Catalyst," U.S. Appl. No. 12/638,511, filed Dec. 15, 2009, 53 pages.

(Continued)

*Primary Examiner* — Binh Q Tran
(74) *Attorney, Agent, or Firm* — Julia Voutyras; Alleman Hall McCoy Russell & Tuttle LLP

(57) ABSTRACT

A system for filtering and oxidizing particulate matter produced by a gasoline direct injection engine is disclosed. In one embodiment, engine cylinder air-fuel is adjusted to allow soot to oxidize at an upstream particulate filter while exhaust gases are efficiently processed in a downstream catalyst.

26 Claims, 9 Drawing Sheets

U.S. PATENT DOCUMENTS

| | | |
|---|---|---|
| 2009/0193796 A1 | 8/2009 | Wei et al. |
| 2010/0011749 A1* | 1/2010 | Fujiwara et al. ............... 60/286 |
| 2010/0205942 A1* | 8/2010 | Fujiwara et al. ............... 60/285 |

FOREIGN PATENT DOCUMENTS

| | | |
|---|---|---|
| EP | 1245817 | 10/2002 |
| EP | 1319811 | 6/2003 |
| JP | 2001263053 | 9/2001 |
| JP | 2001263130 | 9/2001 |
| JP | 2004232544 | 8/2004 |
| JP | 2004251230 | 9/2004 |
| JP | 2006161572 | 6/2006 |
| JP | 2007291980 | 11/2007 |
| JP | 2009030547 | 2/2009 |
| JP | 2009041386 | 2/2009 |
| JP | 2009079487 | 4/2009 |
| JP | 2009085054 | 4/2009 |
| JP | 2009228448 | 10/2009 |
| WO | 2008127755 | 10/2008 |
| WO | WO 2009/038221 A1 * | 3/2009 |

OTHER PUBLICATIONS

Ruhland, Helmut H. et al., "Method for Controlling Spark for Particulate Filter Regenerating," U.S. Appl. No. 12/638,555, filed Dec. 15, 2009, 52 pages.

Hubbard, Carolyn P. et al., "Fuel Control for Spark Ignited Engine Having a Particulate Filter System," U.S. Appl. No. 12/638,595, filed Dec. 15, 2009, 52 pages.

Hubbard, Carolyn P. et al., "Method for Controlling Fuel of a Spark Ignited Engine While Regenerating a Particulate Filter," U.S. Appl. No. 12/638,633, filed Dec. 15, 2009, 53 pages.

Ruona, William C. et al., "Gasoline Particulate Filter Regeneration and Diagnostics," U.S. Appl. No. 12/689,930, filed Jan. 19, 2010, 60 pages.

Bidner, David K. et al., "Particulate Filter Regeneration During Engine Shutdown," U.S. Appl. No. 12/629,743, filed Dec. 2, 2009, 41 pages.

Bidner, David K. et al., "Particulate Filter Regeneration During Engine Shutdown," U.S. Appl. No. 12/610,991, filed Nov. 2, 2009, 65 pages.

Bidner, David K. et al., "Particulate Filter Regeneration in an Engine," U.S. Appl. No. 12/611,002, filed Nov. 2, 2009, 64 pages.

Bidner, David K. et al., "Particulate Filter Regeneration in an Engine," U.S. Appl. No. 12/611,009, filed Nov. 2, 2009, 65 pages.

Bidner, David K. et al., "Particulate Filter Regeneration in an Engine Coupled to an Energy Conversion Device," U.S. Appl. No. 12/611,019, filed Nov. 2, 2009, 64 pages.

Bidner, David K. et al., "Particulate Filter Regeneration in an Engine," U.S. Appl. No. 12/611,027, filed Nov. 2, 2009, 52 pages.

Lupescu, Jason A. et al., "Exhaust Treatment System for Internal Combustion Engine," U.S. Appl. No. 12/579,618, filed Oct. 15, 2009, 57 pages.

Van Nieuwstadt, Michiel J., "Control of Exhaust Flow in an Engine Including a Particulate Filter," U.S. Appl. No. 12/648,833, filed Dec. 29, 2009, 38 pages.

Van Nieuwstadt, Michiel J., "Controlling Operation of Exhaust of an Engine Including a Particulate Filter," U.S. Appl. No. 12/648,839, filed Dec. 29, 2009, 38 pages.

Van Nieuwstadt, Michiel J. et al., "System and Method for Regenerating a Particulate Filter for a Direct Injection Engine," U.S. Appl. No. 12/620,354, filed Nov. 17, 2009, 47 pages.

Van Nieuwstadt, Michiel J. et al., "Method for Adjusting Boost Pressure While Regenerating a Particulate Filter for a Direct Injection Engine," U.S. Appl. No. 12/620,366, filed Nov. 17, 2009, 46 pages.

Van Nieuwstadt, Michiel J. et al., "System for Regenerating a Particulate Filter and Controlling EGR," U.S. Appl. No. 12/620,374, filed Nov. 17, 2009, 46 pages.

Kerns, James M. et al., "Method for Regenerating a Particulate Filter for a Boosted Direct Injection Engine," U.S. Appl. No. 12/620,386, filed Nov. 17, 2009, 46 pages.

* cited by examiner

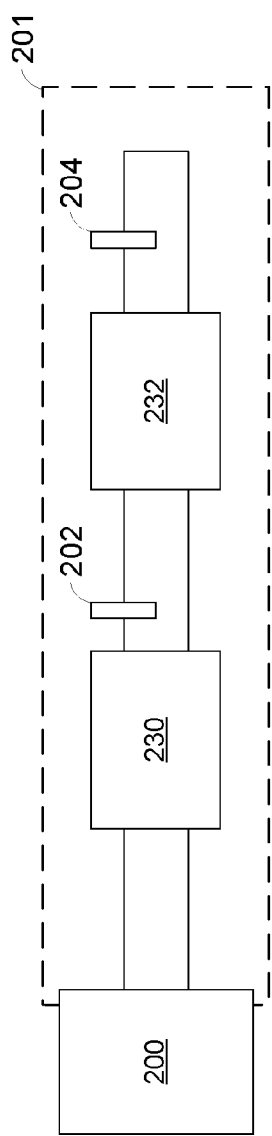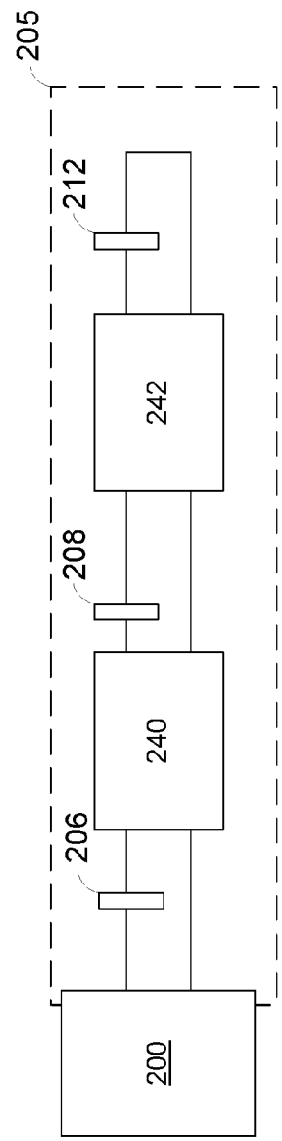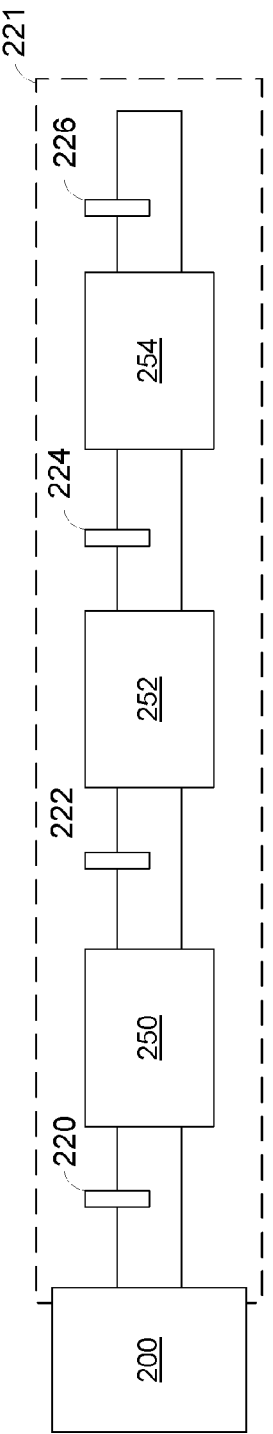

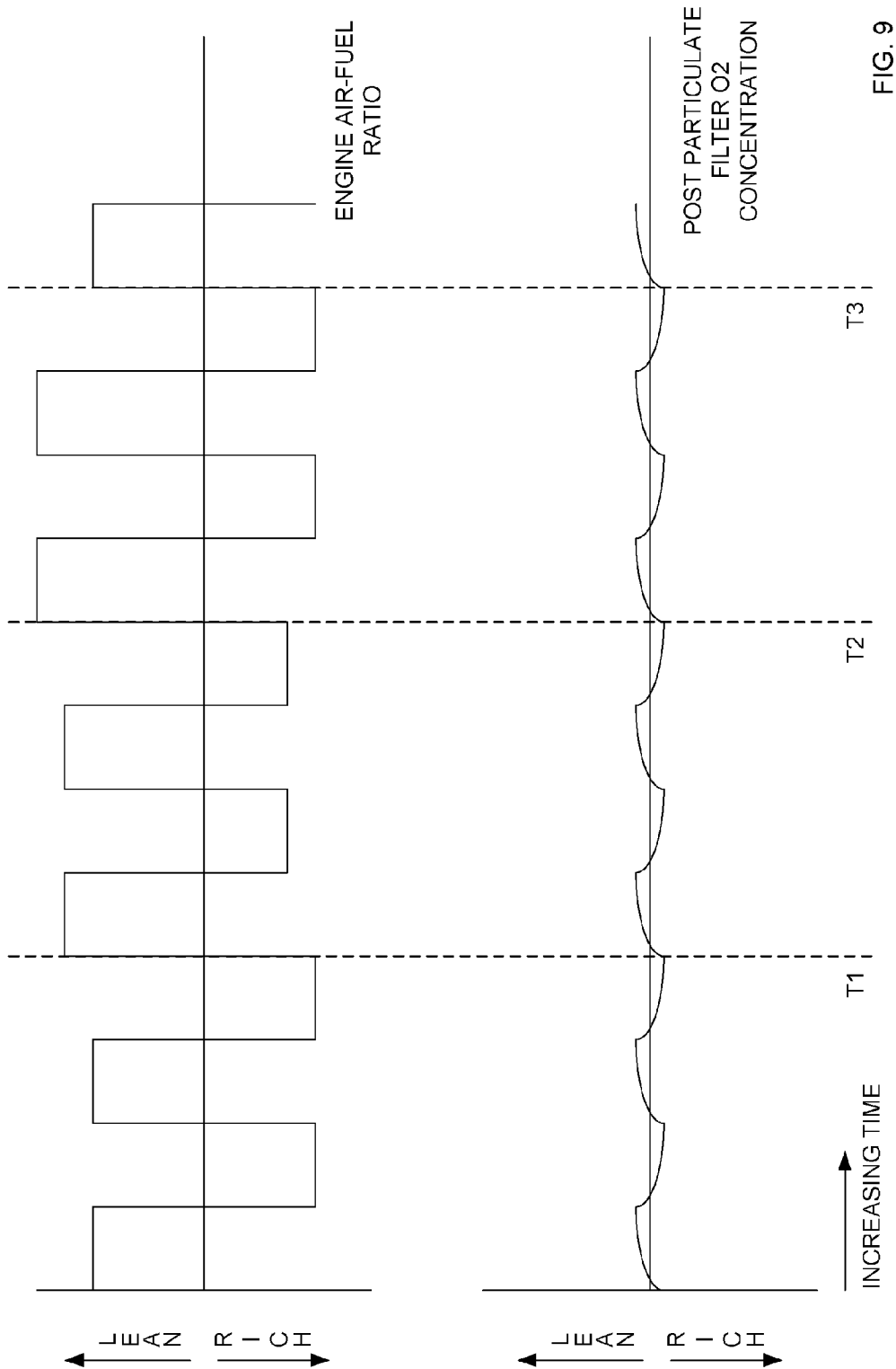

SYSTEM AND METHOD FOR REGENERATING A PARTICULATE FILTER

CROSS-REFERENCE TO RELATED APPLICATIONS

This application claims priority from U.S. Provisional Patent Application No. 61/246,939, entitled "PARTICULATE FILTER SYSTEM AND METHOD FOR REGENERATING," filed Sep. 29, 2009, the disclosure of which is hereby incorporated by reference in its entirety and for all purposes.

TECHNICAL FIELD

The present application relates to the field of automotive emission control systems and methods.

BACKGROUND AND SUMMARY

Direct injection gasoline engines offer improved efficiency because fuel injected directly into a cylinder can reduce cylinder charge temperature. As a result, additional air may enter a cylinder as compared to an equivalent cylinder that has port injected fuel. Consequently, engine power and efficiency may be improved. In addition, direct injection gasoline engines may exhibit improved transient fuel control because there is less tendency for fuel to collect at a cylinder intake port of a direct injection engine than for a port fuel injection engine. However, direct injection engines may generate soot at higher engine speed and load conditions because there is less time available to atomize fuel in the cylinder. As a result, it may be useful to incorporate a particulate filter in the exhaust system of a direct injection engine. Gasoline engines include those engines fueled by pure gasoline or mixtures of gasoline and other fuels such as alcohols. Further, other fuels used in spark ignited engines are also included such as liquid propane gas (LPG) or compressed natural gas (CNG).

In U.S. Patent Application 2009/0193796 a system for treating exhaust gases of a gasoline engine is presented. In several embodiments, a three-way catalyst is followed by a particulate filter. The particulate filter may be coated with various combinations of platinum, palladium, and rhodium. The coated particulate filter may assist in the oxidation of soot that is held by the particulate filter. It may be beneficial to filter gasoline engine emissions with a particulate filter, but over time, a particulate filter may accumulate an amount of soot to the extent that it reduces engine efficiency by increasing backpressure in the exhaust system. The reference appears to provide little direction as to how to remove soot from a particulate filter. Therefore, the system described in the reference may cause engine performance to degrade over time. In addition, the three-way catalysts described in the reference operate at higher efficiencies when gases entering the three-way catalyst are near stoichiometric conditions. However, at stoichiometric conditions it may be difficult to regenerate a particulate filter. Conversely, the particulate filter may favor lean exhaust gases for regeneration, but conversion efficiency of NOx in a catalyst may degrade. The reference appears to offer little direction for overcoming these issues.

The inventors herein have developed a system for processing particulate matter of a gasoline engine having an exhaust system, comprising: a device including at least a first three-way catalyst and a particulate filter, said device is an aftertreatment device located farthest upstream in said exhaust system as compared to all other aftertreatment devices in said exhaust system; and a second three-way catalyst disposed in said exhaust system downstream of said device.

By placing a particulate filter at a location upstream of a three-way catalyst in an exhaust system, a lean exhaust mixture may be exhausted from an engine operating on gasoline while performance degradation of a downstream three-way catalyst is reduced. For example, when a particulate filter is at a temperature where soot held in the filter can be oxidized, a lean exhaust mixture can pass through the particulate filter so that at least a portion of the excess oxygen in the lean exhaust mixture oxidizes the soot held by the filter. Thus, excess oxygen in the exhaust gases can be used to oxidize the soot held by the particulate filter such that exhaust gases that flow through the downstream three-way catalyst can be near stoichiometric conditions. This allows a three-way catalyst located downstream of the particulate filter to operate at a higher efficiency as compared to a condition when a lean mixture is passed through the downstream three-way catalyst.

The present description may provide several advantages. Specifically, the description provides a method for storing and regenerating carbonaceous particulate emissions from a spark-ignited engine while maintaining net stoichiometric exhaust conditions to control tailpipe emissions. The approach may improve engine emissions by providing improved control over exhaust gases that are processed by a three-way catalyst. Further, engine air-fuel control may be simplified, especially if an oxygen sensor is placed in the exhaust system between the particulate filter and a downstream catalyst because a direct measurement of the amount of oxygen consumed by oxidizing soot is possible rather than an inference made by a model. Further still, the method regenerates a particulate filter without having to provide additional hardware, such as an air pump.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWING

FIG. 2a shows a schematic of an example exhaust system configuration;

FIG. 2b shows a schematic of an example exhaust system configuration;

FIG. 2c shows a schematic of an example exhaust system configuration;

FIG. 9 shows an example plot of cylinder air-fuel adjustments and exhaust gas oxygen concentration downstream of a particulate filter.

DETAILED DESCRIPTION OF THE DEPICTED EMBODIMENTS

Figure 1:
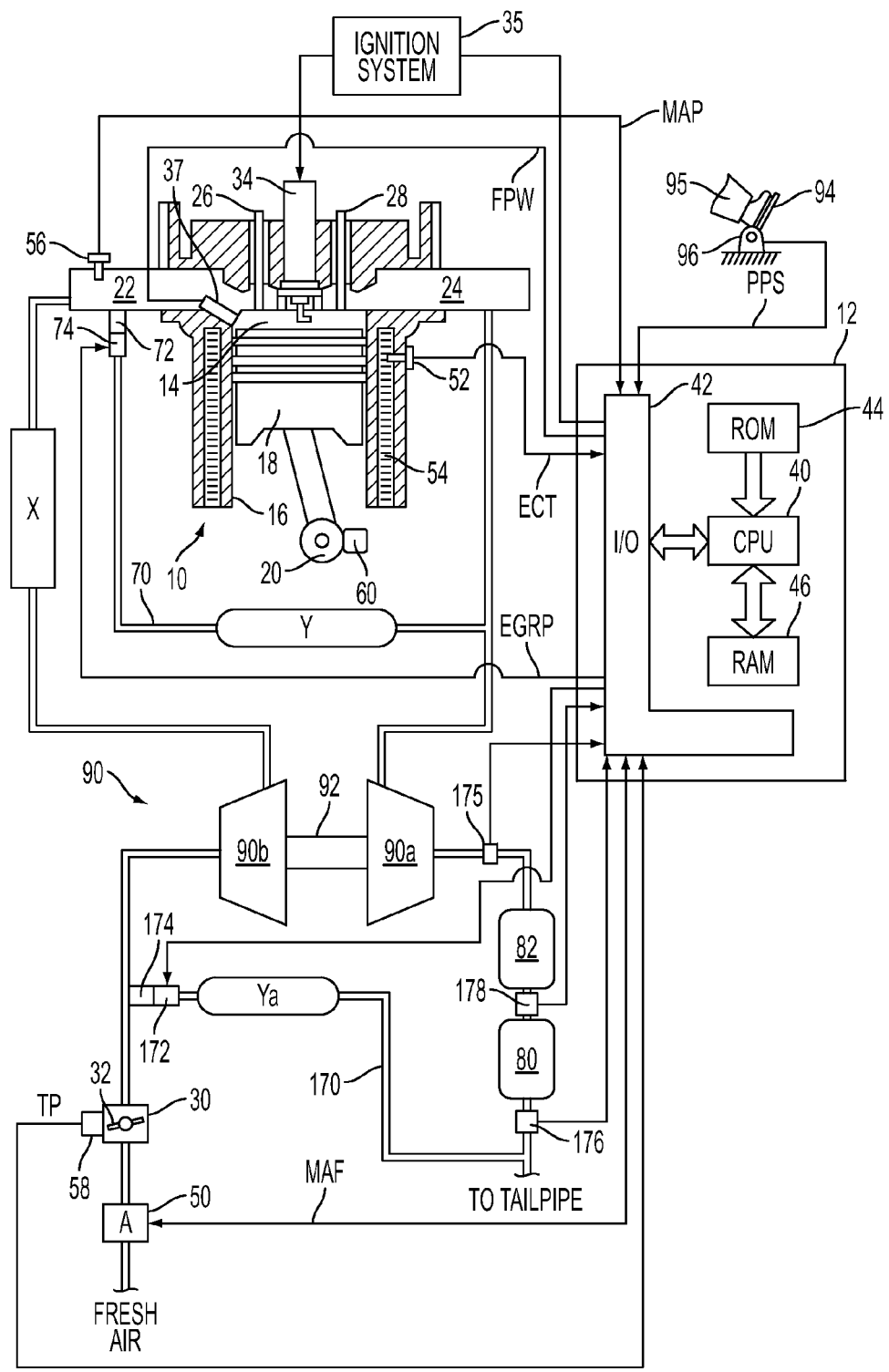
FIG. 1 shows a schematic view of an exemplary embodiment of a gasoline direct injection engine.

FIG. 1 shows an exemplary embodiment of a gasoline direct injection engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22. Note that throttle body 30 and throttle plate 32 may be located at a location downstream of compression device 90 in some applications. Alternatively, throttle body 30 and throttle plate 32 may be omitted.

Combustion chamber 14 is also shown having fuel injector 37 coupled thereto for delivering fuel in proportion to the pulse width of signal (fpw) from controller 12. Fuel is delivered to fuel injector 37 by a conventional fuel system (not shown) including a fuel tank, fuel pump, and fuel rail (not shown). In the case of direct injection engines, as shown in FIG. 1, a high pressure fuel system is used such as a common rail system.

Spark plug 34 provides an ignition source for the contents of combustion chamber 14. Energy for creating a spark is provided by ignition system 35. Controller 12 adjusts the charging of ignition coils that provide voltage to spark plug 34.

In the depicted embodiment, controller 12 is a conventional microcomputer, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass airflow (MAF) from mass airflow sensor 50 coupled to the air filter [A on FIG. 1]; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect (or variable reluctance) sensor 60 coupled to crankshaft 20 indicating engine speed.

Engine 10 may include an exhaust gas recirculation (EGR) system to help lower NO and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. The depicted high pressure EGR system includes high pressure EGR valve assembly 72 located in high pressure EGR tube 70. Exhaust gas travels from exhaust manifold 24 first through high pressure EGR valve assembly 72, and then to intake manifold 22. An EGR cooler [shown at Y in FIG. 1] may be located in high pressure EGR tube 70 to cool recirculated exhaust gases before entering the intake manifold. Cooling is typically done using engine water, but an air-to-air heat exchanger may also be used.

Engine 10 may also include a low pressure EGR system. The depicted low pressure EGR system includes a low pressure EGR tube 170 communicating with exhaust manifold 24 at a location downstream of exhaust turbine 90a, and communicating with intake manifold 22 at a location upstream of intake compressor 90b. A low pressure valve assembly 172 is located in low pressure EGR tube 170. Exhaust gas in the low pressure EGR loop travels from turbine 90a through a aftertreatment device 82 (for example, a particulate filter including a three-way catalyst be comprised of a wash coat including platinum, palladium, and rhodium) and aftertreatment device 80 before entering low pressure EGR tube 170. Aftertreatment device 82 processes engine exhaust gases to retain soot and oxidize exhaust gas constituents, for example. Additional exhaust system configurations are described in the following description and figures. A low pressure EGR cooler Ya may be positioned along low pressure EGR tube 170.

Note that in the context of this description, an aftertreatment device may include various types of catalysts, including oxidation catalysts, SCR catalysts, catalyzed particulate filter (e.g., a uniform, zone coated, or layered catalyzed filter), three-way catalysts, and further includes particulate filters, hydrocarbon traps, and NOx traps but does not include sensors and actuators such as oxygen sensors, NOx sensors, or particulate sensors. Some specific examples of aftertreatment configurations may be explicitly referred to by example.

High pressure EGR valve assembly 72 and low pressure EGR valve assembly 172 each has a valve (not shown) for controlling a variable area restriction in high pressure EGR tube 70 and low pressure EGR tube 170, which thereby controls flow of high and low pressure EGR, respectively.

Vacuum regulators 74 and 174 are coupled to high pressure EGR valve assembly 72, low pressure EGR valve assembly 172. Vacuum regulators 74 and 174 receive actuation signals from controller 12 for controlling the valve positions of high pressure EGR valve assembly 72, low pressure EGR valve assembly 172. In a preferred embodiment, high pressure EGR valve assembly 72 and low pressure EGR valve assembly 172 are vacuum actuated valves. However, any type of flow control valve or valves may be used such as, for example, an electrical solenoid powered valve or a stepper motor powered valve.

Compression device 90 may be a turbocharger or any other such device. The depicted compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used).

Concentration of oxygen present in the exhaust system may be assessed by oxygen sensors 175, 178 and 176. Further, additional oxygen sensors (not shown) or fewer oxygen sensors may be placed at various locations in the exhaust system as described herein. Oxygen sensor 175 senses engine feed-gas oxygen concentration while oxygen sensor 178 senses exhaust gas oxygen downstream of aftertreatment device 82. Oxygen sensors may be wide range sensors having a linearized output or they may be sensors that indicate a high gain signal near stoichiometric conditions.

Further, drive pedal 94 is shown along with a driver's foot 95. Pedal position sensor (pps) 96 measures angular position of the driver actuated pedal. It will be understood that the depicted engine 10 is shown only for the purpose of example and that the systems and methods described herein may be implemented in or applied to any other suitable engine having any suitable components and/or arrangement of components.

Referring now to FIG. 2a, a schematic of an example exhaust system configuration is shown. Exhaust system 201 is comprised of an aftertreatment device 230 which is comprised of an oxidation catalyst and a particulate filter absent of an oxygen storage medium (e.g., ceria). Alternatively, in some applications aftertreatment device 230 may be comprised of a particulate filter or a uniform, zone coated, or layered catalyzed particulate filter, the filter absent an oxygen storage medium. Aftertreatment device 230 is shown at the most upstream location 230, downstream of engine 200. Oxygen sensor 202 is located downstream of aftertreatment device 230 and upstream of aftertreatment device 232. Aftertreatment device 232 may be comprised of a three-way catalyst, for example. Oxygen sensor 204 is located downstream of aftertreatment device 232.

In the embodiment of FIG. 2a, oxygen sensor 202 advantageously accounts for engine exhaust gas oxygen that is consumed when soot is combusted in particulate filter 230. When particulate filter 230 is below the oxidation temperature of soot, oxygen sensor 202 indicates the engine out feed gas oxygen concentration. On the other hand, oxygen sensor 202 indicates the concentration of oxygen entering aftertreatment device 232 whether or not soot held by particulate filter 230 is combusted.

By sensing the oxygen in engine exhaust gas, it is possible to determine whether an engine is combusting a rich or lean air-fuel mixture. Further, by sensing exhaust gases entering an aftertreatment device it is possible to estimate and control the operation of the aftertreatment device. In the particular configuration of FIG. 2a, oxygen sensor 202 provides an indication of oxygen entering aftertreatment device 232. Further, oxygen sensor 202 senses oxygen in engine feed gases when soot held in aftertreatment device 230 is not being oxidized. On the other hand, when soot is being oxidized by aftertreatment device 230, no estimate of oxidized soot is needed to determine the amount of oxygen entering downstream aftertreatment device 232. Therefore, the amount of fuel delivered to engine 200 can be adjusted so that aftertreatment device is exposed to near stoichiometric exhaust gases without having to estimate how much oxygen is consumed by soot oxidation. For example, if soot is being oxidized, and oxygen sensor 202 indicates a lean air-fuel mixture, engine fuel can be increased so that the oxygen concentration entering the downstream aftertreatment device is at a stoichiometric level. Conversely, if soot is being oxidized and oxygen sensor 202 indicates a rich air-fuel mixture, engine fuel can be decreased. Thus, when oxygen from the engine exhaust gas participates in oxidation of soot held by aftertreatment device 230, engine fuel can be adjusted so that downstream aftertreatment device 232 is exposed to a desired amount of oxygen.

It should also be noted that oxygen sensor 202 may be used to determine whether other exhaust gas constituents are increasing or decreasing. For example, near stoichiometric conditions, an increasing amount of oxygen may indicate increasing NOx while a decreasing oxygen concentration may indicate increased HC and CO emissions.

Downstream oxygen sensor 204 may be used to indicate or infer the state of aftertreatment device 232. In one example, when oxygen sensor 204 indicates a lean condition, an air-fuel mixture supplied to engine 200 may be enriched so that aftertreatment device 232 may be brought back to stoichiometric conditions. In another example, when oxygen sensor 204 indicates a rich condition, an air-fuel mixture supplied to engine 200 may be leaned so that aftertreatment device 232 may be brought back to stoichiometric conditions. In this way, an air-fuel mixture supplied to an engine can be adjusted to improve and account for the performance of an aftertreatment device (e.g., a particulate filter) located upstream in an exhaust system while also maintaining efficient operation of a downstream aftertreatment device (e.g., a three-way catalyst).

Referring now to FIG. 2b, a schematic of an example exhaust system configuration is shown. Upstream oxygen sensor 206 directly senses engine feed gases from engine 200. Farthest upstream aftertreatment device 240 may be comprised of a particulate filter and a three-way catalyst. Oxygen sensor 208 senses exhaust gases that have been processed by aftertreatment device 240. By providing an oxygen sensor downstream of aftertreatment device 240, advantages may be realized over a system that provides a sole oxygen sensor at 206 or over a system that provides a sole oxygen sensor at 208. For example, engine feed gas emissions may be directly sensed by oxygen sensor 206, while oxygen utilized or stored in the three-way catalyst portion of aftertreatment device 240 is observable by oxygen sensor 208. In addition, oxygen sensor 208 senses the reduction in exhaust gas oxygen when soot is combusted in the particulate filter portion of aftertreatment device 240. As a result, the output of sensors 206 and 208 can be compared to determine when the catalyst portion of the aftertreatment device lights off (e.g. light off may be indicated by the catalysts ability convert oxygen) and when oxidation of soot in the particulate filter begins. For example, the oxygen concentration passing through the upstream aftertreatment device can be subtracted from the amount of oxygen entering the upstream aftertreatment device. When the oxygen concentration deviates from a base level of oxygen usage, it can be determined that the catalyst has been activated (e.g., there is catalyst light off) or that soot is being combusted within the particulate filter. Since the catalyst begins to activate at lower temperatures than the temperature at which soot begins to oxidize, it is possible to monitor oxygen concentrations upstream and downstream of a device that acts as a catalyst and particulate filter and determine when catalyst light off occurs and when soot oxidation begins. For example, within a first temperature range of the particulate filter, the oxygen concentration downstream of an aftertreatment device can be subtracted from the oxygen concentration upstream of the aftertreatment device, and the difference can indicate catalyst light off by sensed oxygen storage. Within a second temperature range, higher than the first temperature range, the oxygen concentration downstream of an aftertreatment device can be subtracted from the oxygen concentration upstream of the aftertreatment device, and the difference can indicate when soot begins to oxidize within an aftertreatment device.

Downstream aftertreatment device 242 may be comprised of a three-way catalyst in the illustrated configuration. And, downstream oxygen sensor 212 may be used to indicate the state of downstream aftertreatment device 242. Further, the combination of oxygen sensors 208 and 212 may provide even more information as to the state of aftertreatment device 242. For example, the output of oxygen sensor 212 can be subtracted from the output of oxygen sensor 208 to determine the oxygen storage capacity of aftertreatment device 242. In particular, the difference in oxygen sensed by oxygen sensor 208 and oxygen sensor 212 when the state of aftertreatment device 242 transitions from rich to lean, the difference in oxygen concentration sensed by oxygen sensors 212 and 208 provides an indication of the oxygen storage capacity of aftertreatment device 242.

In one embodiment, portions of soot held by aftertreatment device 240 can be oxidized by repeatedly cycling aftertreatment device 240 between rich and lean exhaust gas conditions while oxygen in aftertreatment device 242 is depleted and restored without substantially depleting or restoring the total storage capacity of aftertreatment device 242. For example, fuel supplied to an engine can be modulated about stoichiometry so that at least a cylinder of the engine combusts an air-fuel mixture that is rich or lean of stoichiometry. The frequency, duty cycle, and degree of richness or leanness can be varied to modulate the combusted air-fuel mixture, thereby modulating the exhaust gas oxygen concentration. The configuration of FIG. 2b allows the state of aftertreatment device 240 to change between an oxygen concentration in excess of stoichiometric conditions and an oxygen concentration that is less than stoichiometric conditions. At the same time, the state of aftertreatment device 242 can be monitored so that fuel supplied to the engine is adjusted such that oxygen storage capacity of aftertreatment device 242 is not substantially depleted or filled. For example, the oxygen storage amount can be held near 50% of the oxygen storage capacity of aftertreatment device 242; or the oxygen storage amount can be held in a range of 20%-80%, preferably 40-60% of the oxygen storage capacity.

In another embodiment, oxygen sensor 208 may be removed from the system of FIG. 2b. If oxygen sensor 208 is removed, engine fuel adjustments may be based on oxygen sensors 206 and 212. In one embodiment the amount of oxygen entering aftertreatment device 242 may be estimated by a model that estimates soot accumulation and soot oxidation. Soot accumulation may be modeled as a mass from empirically determined test results. For example, the amount of soot expelled by an engine at different engine speeds and loads can be stored in a table or function. When the engine is operated, the table may be interrogated based on present engine speed and load to determine the amount of soot directed to a particulate filter of the exhaust system. Likewise, the oxidation rate of soot may be estimated in a similar fashion from engine exhaust oxygen concentration and particulate filter temperature. By knowing the oxygen concentration of exhaust gases entering aftertreatment device 240, the oxygen storage capacity of aftertreatment device 240, the oxidation rate of soot of after treatment device 240, and the amount of soot stored by aftertreatment device 240, the amount oxygen entering aftertreatment device 242 can be estimated. When the amount of estimated oxygen stored in aftertreatment device 242 is below a threshold or exceeds a threshold, engine fuel may be adjusted rich or lean to return aftertreatment device 242 to a desired amount of stored oxygen.

Oxygen sensor 212 provides oxygen concentration information from downstream of aftertreatment device 242 so that engine fuel may be adjusted in response to an observable oxygen concentration. For example, if oxygen sensor 212 indicates a lean condition, fuel is increased to the engine to reduce oxygen in the exhaust gases. If oxygen sensor 212 indicates a rich condition, fuel is decreased to the engine to increase oxygen in the exhaust gases.

Referring now to FIG. 2c, a schematic of an example exhaust system configuration is shown. Oxygen sensor 220 directly senses exhaust gases from engine 200. Three-way catalyst 250 oxidizes and reduces exhaust gas constituents before exhaust gases flow to particulate filter 252. Oxygen sensor 222 senses exhaust gases that have passed through three-way catalyst 250 and particulate filter 252. Three-way catalyst 254 further processes undesirable exhaust gases that have passed through three-way catalyst 250 and particulate filter 252. Downstream oxygen sensor 224 senses oxygen that has passed through the upstream catalysts and particulate filter.

The system of FIG. 2c operates similar to the system shown in FIG. 2b. However, three-way catalyst 250 and particulate filter 252 are separate components so that the volumes of each component can be varied without necessarily having to vary the volume of the other component. In one example, the three-way catalyst volume is less than half the volume of particulate filter 252 or three-way catalyst 254. By lowering the volume of the three-way catalyst, the catalyst may light off faster because less mass has to be heated before the three-way catalyst reaches operating temperature. Oxygen sensor 220 provides the same functions and is utilized in a manner similar to oxygen sensor 206. Oxygen sensor 222 provides oxygen concentration information of exhaust gases that have been processed by three-way catalyst 250. Oxygen sensor 224 provides oxygen concentration information of exhaust gases that have been utilized in the oxidation of soot. By providing oxygen sensors upstream and downstream of the particulate filter, a measured discrimination between oxygen storage capacity of the farthest upstream catalyst and the oxygen utilization during soot oxidation is provided. And finally, oxygen sensor 226 provides the same functions and is utilized in a manner similar to oxygen sensor 212 described above.

Figure 3:
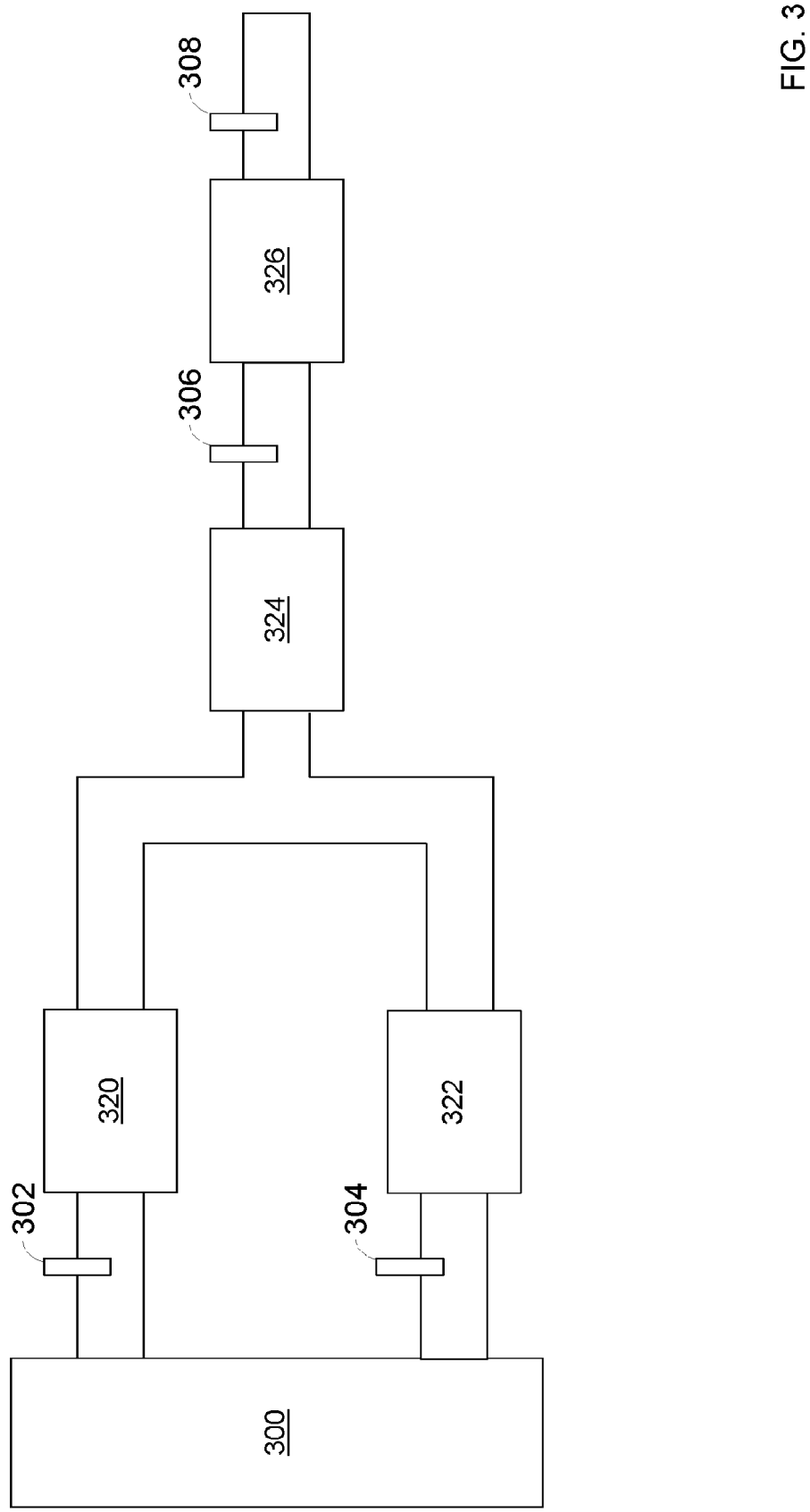
FIG. 3 shows a schematic of an example exhaust system configuration.

Referring now to FIG. 3, a schematic of an example exhaust system configuration is shown. Upstream oxygen sensors 302 and 304 directly sense engine feed gases from different cylinder banks of engine 300. Farthest upstream three-way catalysts 320 and 322 are located upstream of particulate filter 324. Oxygen sensor 306 senses exhaust gases that have been processed by three-way catalysts 320 and 322. In particular, exhaust gases from two cylinder banks are combined and delivered to particulate filter 324 before reaching oxygen sensor 306. Oxygen sensor 306 is located downstream of particulate filter 324 and upstream of three-way catalyst 326. Oxygen sensor 306 provides an indication of oxygen concentration that is related to both cylinder banks of engine 300. In one example, if oxygen sensor 306 observes a higher concentration of oxygen present in the exhaust system, the cylinder bank that indicates a leaner air-fuel mixture being combusted will be richened to bring the exhaust gas concentration closer to a stoichiometric mixture. Similar to sensor 224 of FIG. 2c, downstream oxygen sensor 308 may be used to adjust the amount of fuel delivered to cylinders of engine 300. In particular, oxygen sensor 308 provides oxygen concentration information from downstream of aftertreatment device 326 so that engine fuel to each cylinder bank may be adjusted in response to an observable oxygen concentration by downstream sensor 308. For example, if oxygen sensor 308 indicates a lean condition, fuel is increased to the engine cylinder bank that exhibits the leanest mixture as sensed at oxygen sensor 302 or 304. If oxygen sensor 308 indicates a rich condition, fuel is decreased to the engine to the engine cylinder bank that exhibits the richest mixture as sensed at oxygen sensor 302 or 304.

Figure 4:
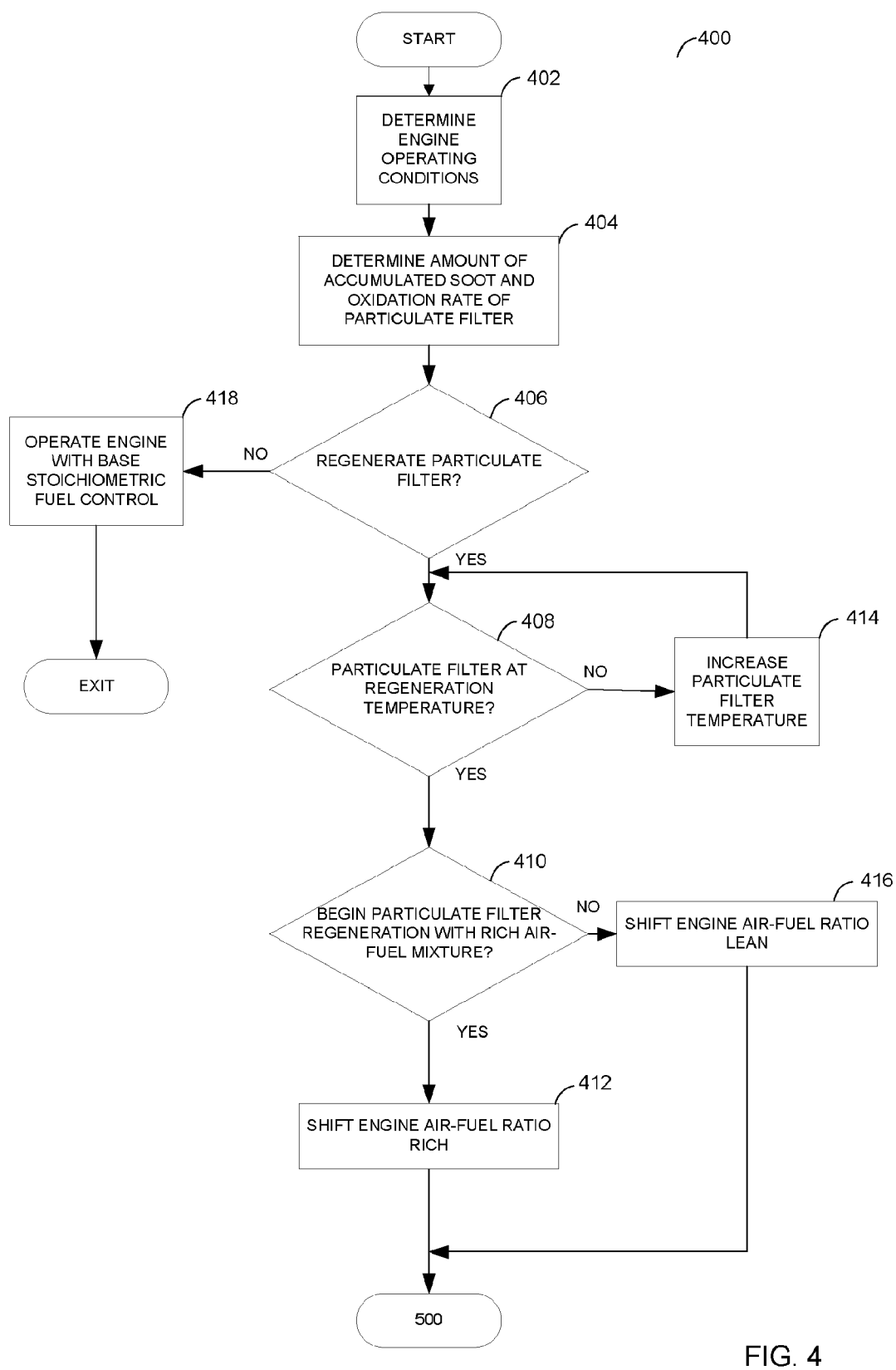
FIG. 4 shows a flow chart of part of a fuel control method to regenerate a particulate filter for a gasoline engine.

Referring now to FIG. 4, a flow chart of part of a fuel control method to regenerate a particulate filter for a gasoline engine is shown. At 402, engine operating conditions are determined from sensors and actuators. In one example, routine 400 determines engine temperature, ambient temperature, the pressure drop across a particulate filter or aftertreatment device, time since engine start, engine load, engine torque demand, temperature of a catalyst downstream of a particulate filter, engine speed, and amount of air inducted to the engine. In other example embodiments, additional or fewer operating conditions may be determined based on specific objectives. After determining engine operating conditions routine 400 proceeds to 404.

At 404, an amount of soot held by a particulate filter as well as a soot oxidation rate are determined. As discussed above, in one embodiment, soot accumulation may be modeled as a mass from empirically determined test results. In this embodiment, the amount of soot expelled by an engine at different engine speeds and loads can be stored in a table or function. When the engine is operated, the table may be interrogated based on present engine speed and load to determine the amount of soot directed to a particulate filter of the exhaust system. Likewise, the oxidation rate of soot may be estimated in a similar fashion from engine exhaust oxygen concentration and particulate filter temperature. For example, a table holding oxidation rates of soot may be indexed by particulate filter temperature and mass flow rate of oxygen to the filter. If the oxidation rate of soot exceeds the rate of soot storage, the particulate filter is considered as being regenerated because a portion of the soot storage capacity is being liberated by the oxidation of soot. Routine 400 then proceeds to 406.

At 406, routine 400 judges whether or not to initiate regeneration of a particulate filter. In one embodiment, routine 400 makes a decision based on the pressure drop across a particulate filter. In another embodiment, routine 400 may decide to regenerate the particulate filter in response to a model. For example, a soot accumulation model that estimates the amount of soot produced by an engine may be the basis for regenerating a particulate filter. If the estimated amount of soot exceeds a threshold, particulate filter regeneration is initiated. On the other hand, if a pressure across the particulate filter is determined from a sensor or an estimating model, particulate filter regeneration may be initiated after the observed or estimated pressure exceeds a threshold.

In addition, other conditions may be included that determine when to regenerate the particulate filter. For example, filter regeneration may not proceed if engine temperature is above a threshold temperature or if engine temperature is below a threshold temperature. Further in one example, filter regeneration may not proceed if filter temperature is below a threshold. However, if soot is accumulated on the filter, controller 12 may elevate the filter temperature by retarding spark and increasing engine air flow as is described by the description of FIG. 6 until a threshold filter temperature is reached. In this example, particulate filter regeneration may proceed after the threshold temperature is reached. In still another example, particulate filter regeneration may not proceed for a period of time since engine start. For example, particulate filter regeneration may not be initiated until enough time for engine speed to stabilize after engine start has passed. In another embodiment, particulate filter regeneration may be initiated during deceleration fuel shut-off. In yet another embodiment, particulate filter regeneration may not be initiated unless engine load is greater than a threshold (for example, engine load may be the desired engine torque divided by total torque available from the engine; in other applications load may be the cylinder air charge divided by the total theoretical cylinder air charge), 0.3 load for example. In another example, particulate filter regeneration may not proceed until a catalyst located downstream of a particulate filter is at a threshold temperature.

It should be noted that a particulate filter may be actively or passively regenerated. During active regeneration engine operating conditions can be adjusted to intentionally facilitate or improve particulate filter regeneration. For example, engine spark timing may be adjusted to increase the temperature of a particulate filter to increase soot oxidation. Conversely, passive particulate filter regeneration is possible when engine operating conditions cause soot held by the particulate filter to oxidize without a particulate filter regeneration request, for example. In one embodiment, a particulate filter may be passively regenerated when the engine is operated at higher engine speeds and loads. The regeneration may be passive even though engine air fuel is adjusted in response to an oxygen concentration in the exhaust system, the oxygen concentration influenced by the oxidation of particulate matter held by the particulate filter.

If particulate filter regeneration is desired and conditions are met, routine 400 proceeds to 408. Otherwise, routine 400 proceeds to 418.

At 418, routine 400 returns to operating the engine with base stoichiometric fuel control. It should be noted that base fuel control allows the engine to operate lean or rich of stoichiometry during some conditions. For example, an engine may be operated lean with base fuel control during cold start to reduce hydrocarbon emissions. Conversely, an engine may be operated rich with base fuel control during high load conditions to reduce the possibility of engine degradation. In addition, the engine may be operated in various cyclic lean and rich conditions that preserve the time-averaged net stoichiometric conditions.

At 408, routine 400 judges if the particulate filter is at a temperature that supports oxidation of soot and other matter that may be held by a particulate filter. If routine 400 judges that a particulate filter is at a temperature that supports regeneration and oxidation, routine 400 proceeds to 410. Otherwise, routine 400 proceeds to 414.

Figure 6:
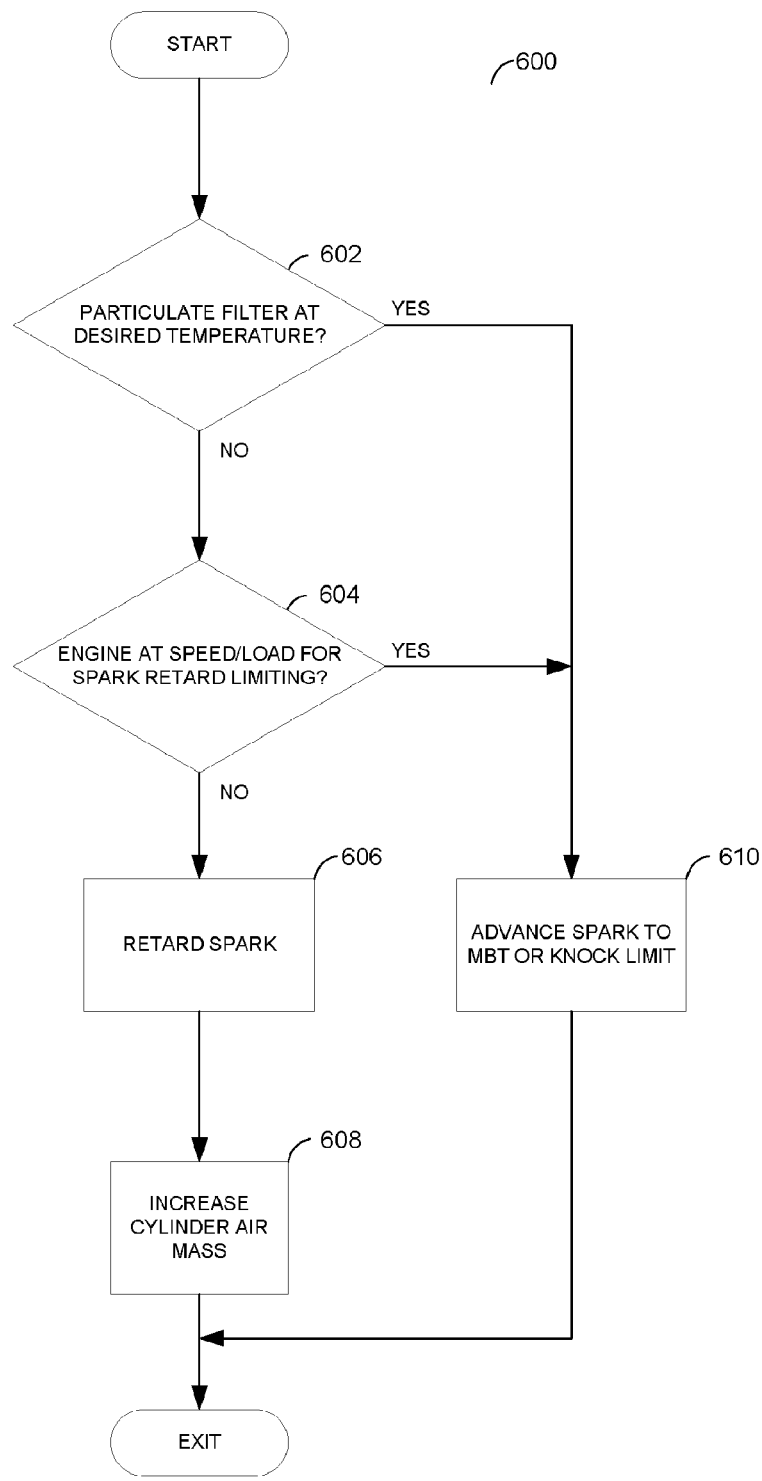
FIG. 6 shows a flow chart of a method for increasing the temperature of a particulate filter for a gasoline engine.

At 414, routine 400 begins to raise the particulate filter temperature to promote filter regeneration. In particular, the method describe by FIG. 6 is used to elevate the particulate filter temperature. Routine 400 then returns to 408 to judge whether or not the particulate filter temperature is sufficient to proceed to 410.

At 410, routine 400 judges whether to begin the particulate filter regeneration with products of lean or rich combustion. In one embodiment, during a first operating condition, regeneration begins by ramping fuel from substantially stoichiometric (e.g., ±0.04 lambda where lambda is air-fuel ratio/air-fuel ratio at stoichiometry) combustion to rich combustion. In particular, the engine air-fuel is ramped rich until substantially all oxygen storage (e.g., more than 75% of available oxygen storage capacity) is depleted in any aftertreatment device upstream of and including the particulate filter. Then, the engine air-fuel mixture is driven lean by ramping fuel lean or by a step change in cylinder air-fuel mixture (e.g., jumping from 0.95λ to 1.05λ in response to oxygen depletion). By depleting oxygen in upstream aftertreatment devices, it is possible to increase the oxygen flow rate to the particulate filter while reducing the possibility of oxygen slippage through the particulate filter and oxygen and/or NOx slippage through aftertreatment devices that are located downstream of the particulate filter. In this way, the rate of oxidation may be improved because kinetic interaction between soot and oxygen increases with higher oxygen flow rates. In another embodiment, or during a second operating condition different than the first operating condition, regeneration begins by adjusting engine air-fuel mixtures lean of stoichiometric conditions. In one example, the engine air-fuel is gradually adjusted lean so that oxidation of soot gradually increases. In this way, the rate of oxidation can be controlled so that the particulate filter temperature gradually increases and so that the engine air-fuel ratio can be used to control the temperature of the particulate filter. In one example, routine 400 judges whether to start the oxidation process lean or rich in response to a temperature of the particulate filter. For example, if the particulate filter temperature is near the threshold oxidation temperature, routine 400 begins the particulate filter oxidation process by going rich. On the other hand, if the particulate filter temperature is higher than the threshold oxidation temperature, routine 400 begins the particulate filter oxidation process by going lean. If routine 400, judges to start the particulate filter oxidation process by going rich, routine 400 proceeds to 412. Otherwise, routine 400 proceeds to 416. Thus, routine 400 provides the ability to always begin the particulate filter oxidation process rich or lean. But, routine 400 also provides for beginning the particulate filter oxidation process rich or lean depending on conditions. For example, under a first condition the particulate filter oxidation process may begin lean or rich, and under a second condition the particulate filter oxidation process may begin in the other of state of rich or lean under a second condition.

At 412, routine 400 begins particulate filter oxidation by ramping engine air-fuel rich until it is determined that exhaust gases downstream of the particulate filter contain a threshold amount less of oxygen than a stoichiometric exhaust gas mixture. In one embodiment, an oxygen sensor downstream of the particulate filter provides data that indicates when the oxygen upstream of the oxygen sensor is substantially depleted. In one embodiment, the extent that the engine air-fuel mixture can be richened is limited to a threshold amount. After the air-fuel ratio of the engine is shifted rich, routine 400 proceeds to the remainder of the routine described by FIG. 5 and routine 500.

At 416, routine 400 begins particulate filter oxidation by ramping engine air-fuel lean until it is determined that exhaust gases downstream of the particulate filter contain a threshold amount more of oxygen than a stoichiometric exhaust gas mixture. In one embodiment, an oxygen sensor downstream of the particulate filter provides data that indicates when the oxygen begins to break through aftertreatment devices that are located upstream of the oxygen sensor. In one embodiment, the extent that the engine air-fuel mixture can be leaned is limited to a threshold amount. After the air-fuel ratio of the engine is shifted lean, routine 400 proceeds to the remainder of the routine described by FIG. 5 and routine 500.

Figure 5:
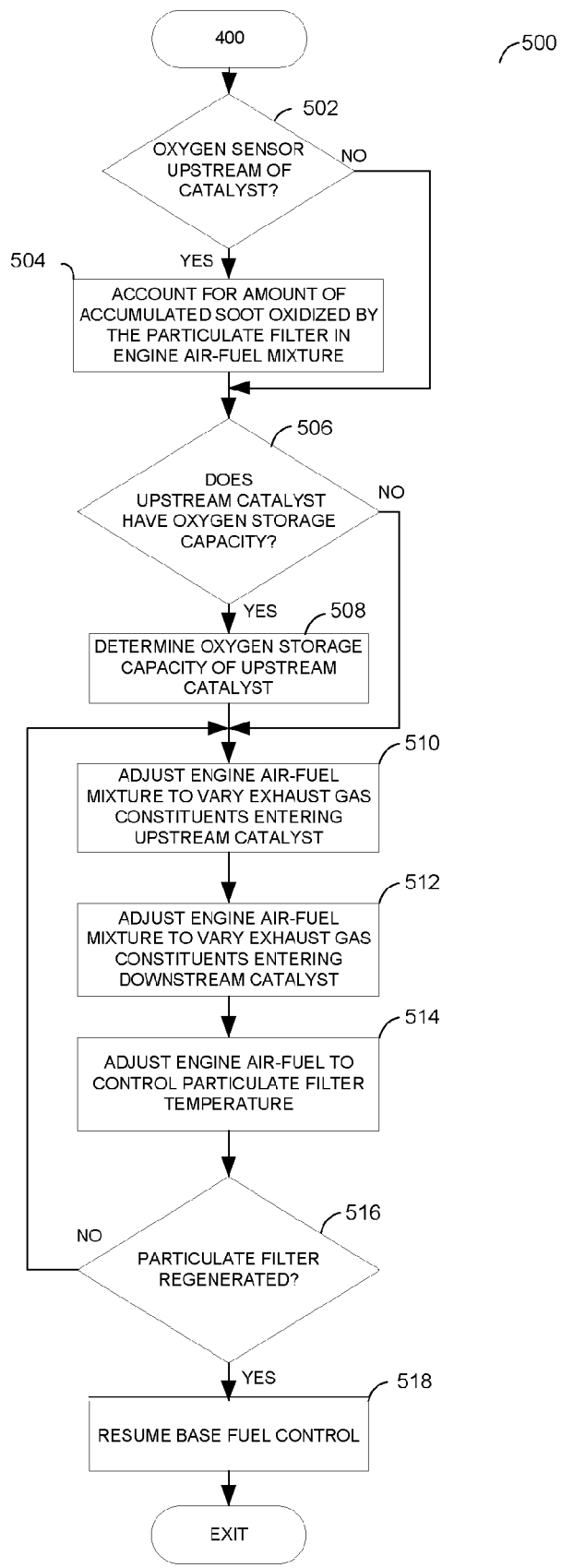
FIG. 5 shows a flow chart of the remaining part of a fuel control method shown in FIG. 4.

Referring now to FIG. 5, the remainder of the routine shown in FIG. 4 is shown. At 502, routine 500 judges whether or not there is an oxygen sensor located upstream of a catalyst and if the oxygen sensor is the oxygen sensor used to determine engine feed gas oxygen concentration. Routine 500 may judge the location of oxygen sensors based on system configuration information stored in memory of an engine controller, for example. If routine 500 judges that the farthest upstream oxygen sensor is located upstream of a catalyst, routine 500 proceeds to 504; otherwise, routine 500 proceeds to 506.

At 504, routine 500 accounts for the amount of accumulated soot oxidized within a particulate filter. Specifically, in one embodiment, routine 500 adjusts the stoichiometric air-fuel ratio leaner so that the engine feed gas oxygen concentration indicates a stoichiometric engine air-fuel ratio after the engine exhaust gases pass through the particulate filter and a portion of the engine feed gas oxygen oxidizes the soot held by a particulate filter. Routine 500 then proceeds to 506.

At 506, routine 500 judges whether or not there is a catalyst upstream of a particulate filter and whether or not the catalyst has oxygen storage capacity. Alternatively, the catalyst may be included with the particulate filter. Routine 500 may judge whether or not there is a catalyst upstream of the particulate filter and whether or not the catalyst has oxygen storage capacity based on system configuration information stored in memory of an engine controller, for example. If routine 500 judges that there is a catalyst with oxygen storage capacity, routine 500 proceeds to 508. If no catalyst exists or if the catalyst does not comprise an oxygen storage media, routine 500 proceeds to 510.

At 508, routine 500 determines the oxygen storage capacity of the upstream catalyst. In one embodiment, the oxygen storage capacity is determined from a table that contains oxygen storage data that may be indexed by catalyst temperature. In addition, the oxygen storage capacity extracted from the table can be adjusted to account for catalyst degradation that may occur over time. In one embodiment, the oxygen storage capacity is adjusted based on cycling the catalyst between lean and rich conditions and detecting when the state of the catalyst changes by data from oxygen sensors located upstream and downstream of the catalyst. After determining the oxygen storage capacity of the catalyst, routine 500 proceeds to 510.

At 510, the engine air-fuel ratio is adjusted to vary the exhaust gas constituents entering the upstream catalyst if one is present. In one embodiment, where an upstream oxygen sensor is located between the engine and a catalyst, the upstream oxygen sensor provides feedback of the engine feed gas oxygen concentration. Further, the upstream oxygen sensor indicates the oxygen concentration that is entering the upstream catalyst. By multiplying the oxygen concentration by the mass flow rate through the engine, the mass of oxygen entering the upstream catalyst may be determined. In one embodiment, an oxygen sensor located upstream of a catalyst determines how much oxygen (e.g., the mass of oxygen) is being delivered to the catalyst over an interval of time. In one embodiment, the rate at which oxygen is supplied to the upstream catalyst can be adjusted based on operating conditions. For example, the rate at which oxygen is delivered to the upstream catalyst and particulate filter can be increased when the temperature of the particulate filter exceeds the threshold oxidation temperature by a threshold amount while the particulate filter temperature is below a different threshold temperature. When the temperature of the particulate filter is decreasing or near the threshold oxidation temperature, the rate at which oxygen is delivered to the upstream catalyst and particulate filter can be decreased.

In one embodiment during particulate filter regeneration, fuel supplied to the engine is controlled by fuel control parameters that are different than fuel control parameters used to control engine fueling when the engine is operated under similar conditions while a particulate filter is not being regenerated. For example, the rate at which oxygen is delivered to the exhaust system and the extent of the leanness or richness from stoichiometric conditions can be different when a particulate filter is being regenerated as compared to when a particulate filter is not being regenerated, while the engine is operating at similar operating conditions. In one embodiment, additional oxygen is added to the exhaust gas constituents by leaning cylinder air-fuel mixture while the particulate filter is being regenerated.

Figure 8:
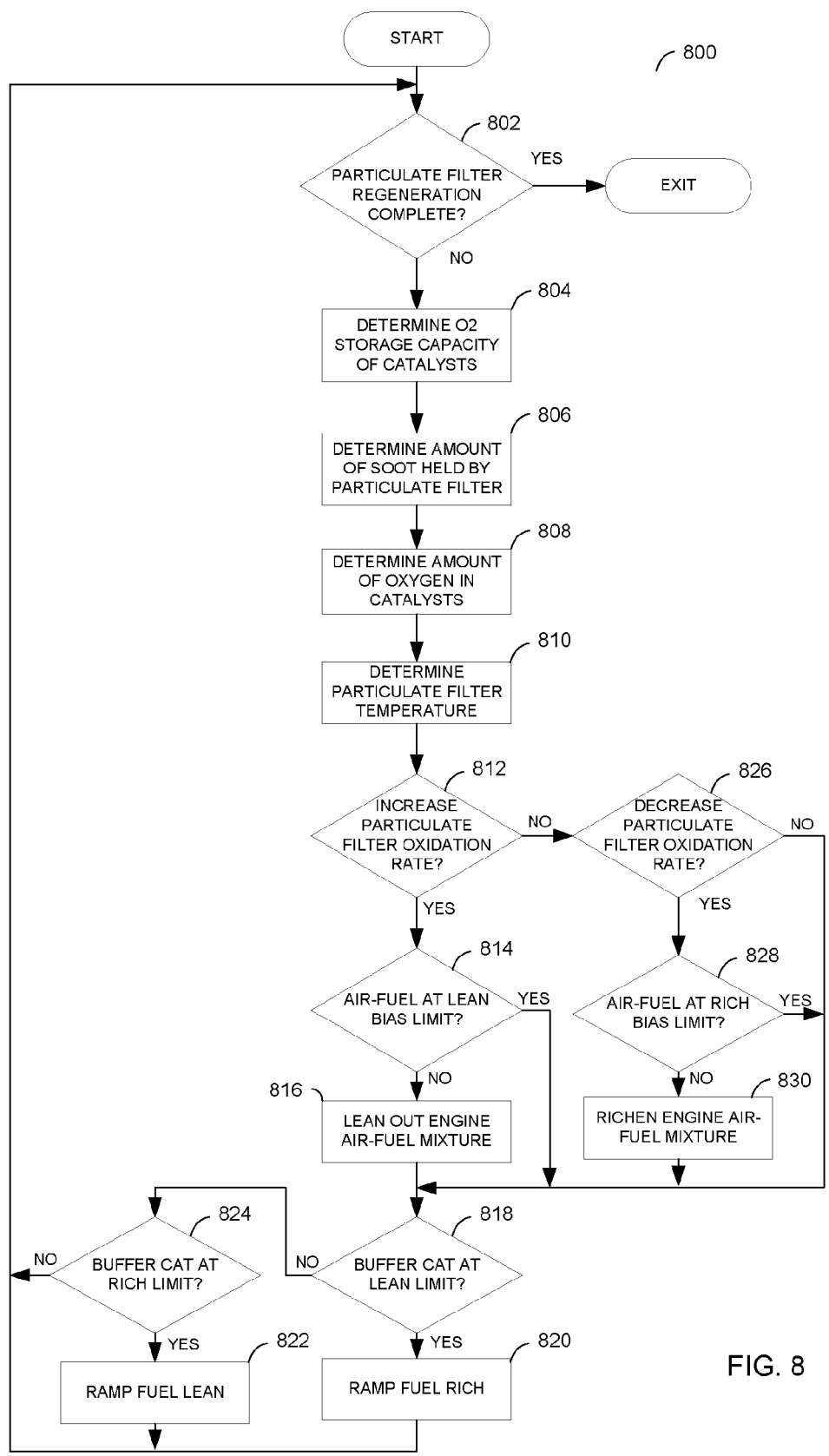
FIG. 8 shows a flow chart of a method for operating a gasoline engine while regenerating a particulate filter.

If an upstream catalyst is not present in a particular configuration, the engine air-fuel ratio may be adjusted to promote oxidation of soot. In one embodiment, an oxygen sensor located upstream of a particulate filter may control the level of oxygen delivered to the particulate filter. For example, an amount of oxygen in excess of a stoichiometric exhaust gas concentration may be made in response to the amount of soot held by the particulate filter or in response to the rate of soot oxidation. For higher amounts of soot held by the particulate filter, higher amounts of oxygen may be supplied to the particulate filter. For lower amounts of soot held by the particulate filter, lower amounts of oxygen may be supplied to the particulate filter. In this way, the amount of oxygen of engine exhaust gases can be controlled so that the excess oxygen in the exhaust gas is used to oxidize soot held in the particulate filter and so that the state of a catalyst that is downstream of the particulate filter is not disturbed to an extent where NOx breaks through a catalyst that is downstream of the particulate filter. FIG. 8 provides more detail as to how engine air-fuel is adjusted during particulate filter regeneration.

At 512, the engine air-fuel ratio is adjusted to vary the exhaust gas constituents entering the downstream catalyst. In one embodiment, the engine air-fuel ratio determined at 510 is adjusted so that the state of a catalyst downstream of the particulate filter is changed. For example, the air-fuel mixture of a cylinder can be adjusted leaner or richer than the adjustment of air-fuel mixture determined at 510. By varying the engine air-fuel mixture the state of the downstream catalyst is adjusted so that it converts efficiently while in a particulate filter regeneration mode.

The engine air-fuel may be adjusted to control the state of a catalyst downstream of a particulate filter by way of an oxygen sensor located upstream of the downstream catalyst, an oxygen sensor located downstream of the downstream catalyst, or by a combination of the oxygen sensor located upstream of the downstream catalyst and the oxygen sensor located downstream of the downstream catalyst. In one example, the air-fuel mixture entering a cylinder can be adjusted richer when an oxygen sensor located downstream of the downstream catalyst indicates a lean condition. When the oxygen sensor located downstream of the downstream catalyst indicates a rich condition, the cylinder air-fuel ratio may be adjusted leaner. On the other hand, the oxygen sensor located upstream of the downstream catalyst can be used to adjust the air-fuel mixture of a cylinder rich when a threshold amount of exhaust gas that is lean has entered the downstream catalyst. When the oxygen sensor located upstream of the downstream catalyst indicates that a threshold amount of exhaust gas has entered the downstream catalyst is rich, the cylinder air-fuel mixture can be adjusted lean. In this way, the amount of oxygen present in the downstream catalyst can be controlled so that HC and CO may be oxidized while NOx is reduced.

At 514, routine 500 can adjust engine cylinder air-fuel mixtures to control the rate of soot oxidation. In one example, oxygen can be introduced to the particulate filter by way of a lean cylinder air-fuel mixture so that excess oxygen is available at the particulate filter to oxidize soot. If the oxidation rate is higher than desired or if the particulate filter temperature increases above a threshold temperature, engine cylinder air-fuel mixtures can be enriched so that less oxygen is available to participate in the oxidation of soot held by the particulate filter. The particulate filter temperature may be measured by a sensor or inferred from engine operating conditions, for example. In addition, the rate that oxygen is delivered to the particulate filter may be varied depending on operating conditions. For example, if the particulate filter temperature is higher than a threshold oxidation temperature but lower than a desired oxidation temperature, then the amount of oxygen supplied to the particulate filter can be increased by leaning cylinder air-fuel mixtures. But, if the particulate filter temperature is higher than a threshold oxidation temperature, but near a desired oxidation temperature, then the amount of oxygen supplied to the particulate filter can be decreased by richening cylinder air-fuel mixtures.

At 516, routine 500 determines if the particulate filter has been sufficiently regenerated. In other words, the routine determines if a desired amount of soot held by a particulate filter has been oxidized. Routine 500 judges whether or not filter regeneration is complete or if conditions for regeneration are no longer present. In one embodiment, regeneration is determined complete when the pressure difference across the particulate filter is less than a predetermined amount. In another example, regeneration is determined as complete when the exhaust gas downstream of the particulate filter indicates an increase in oxygen concentration in exhaust gases that pass through the particulate filter. The increased oxygen concentration may be an indicator that soot in the filter has been oxidized and that the amount of soot is reduced such that less oxygen is consumed to oxidize soot remaining in the filter. If routine 500 judges that regeneration is complete, routine 500 proceeds to 518. Otherwise, routine 500 proceeds to 510.

At 518, routine 500 returns fuel control to base fuel control. In one example embodiment, fuel is adjusted so that over an interval of time, less oxygen is present in exhaust gases when particulate filter regeneration has stopped as compared to when particulate filter regeneration is ongoing. Of course, many ways are available to accomplish this result. For example, the amount of time or the number of cylinder events during which the engine operates lean can be reduced. In another example, the extent to which cylinders are operated lean can be reduced. For example, a cylinder may be operated with a stoichiometric air-fuel mixture rather than with a mixture that is lean by 0.5 air-fuel ratio. In these ways, the engine air-fuel ratio can be adjusted back to base fuel where the engine is combusting a substantially stoichiometric air-fuel mixture, for example.

Referring now to FIG. 6, a flow chart of a method for increasing the temperature of a particulate filter for a gasoline engine is shown. At 602, routine 600 judges whether or not a particulate filter is at a desired threshold oxidation temperature. If so, routine 600 proceeds to 610 where spark is advanced to minimum spark for best torque (MBT) or to knock limited spark. If the particulate filter is not at a desired temperature, routine 600 proceeds to 604. It should be noted that the desired threshold oxidation temperature may be set above a temperature where soot oxidation begins. For example, a desired threshold temperature may be set at 40° C. above the temperature where soot begins to oxidize.

At 604, routine 600 judges if the engine is operating in a region where spark retard is desired. In one example, spark may not be retarded when engine load is above a threshold level. In addition, the threshold may be varied for different engine speeds. For example, spark may not be retarded at an engine speed of 1200 RPM for engine loads greater than 0.6 whereas spark may not be retarded at an engine speed of 5000 RPM for engine loads greater than 0.45. In another embodiment, during regenerating a particulate filter of a spark ignited engine spark timing of at least one cylinder of an engine can be adjusted to regulate a temperature of said particulate filter above a threshold temperature. Further, spark timing can be advanced in response to an increasing driver demand torque. For example, if spark is retarded by 10 degrees to increase a temperature of a particulate filter, the spark can be advanced as a driver torque demand increases so that the engine produces the desired torque and so that the engine has a desired torque response. If the driver subsequently lowers the driver demand torque, the spark may be retarded as the driver torque demand is lowed so that a desired particulate filter temperature is achieved.

If the engine is operating at conditions where it is desirable to retard spark, routine 600 proceeds to 606 where spark is retarded. Otherwise, routine 600 proceeds to 610.

At 606, engine spark is retarded from MBT or knock limited spark. In one example, the spark may be gradually retarded over a number of engine combustion events so that it is less apparent to a vehicle operator. The amount of spark retard may be empirically determined and stored in a table or function that is indexed by particulate filter temperature, engine speed, and engine load.

At 608, routine 600 increases cylinder air charge so that equivalent torque can be produced by the engine while spark is being retarded to heat the particulate filter. In one example, the amount of additional air is stored in a table indexed by spark retard from MBT, engine speed, and engine load. Thus, engine spark advance and engine cylinder air amount are simultaneously adjusted so that the engine will deliver the desired operator torque while increasing particulate filter temperature.

Figure 7:
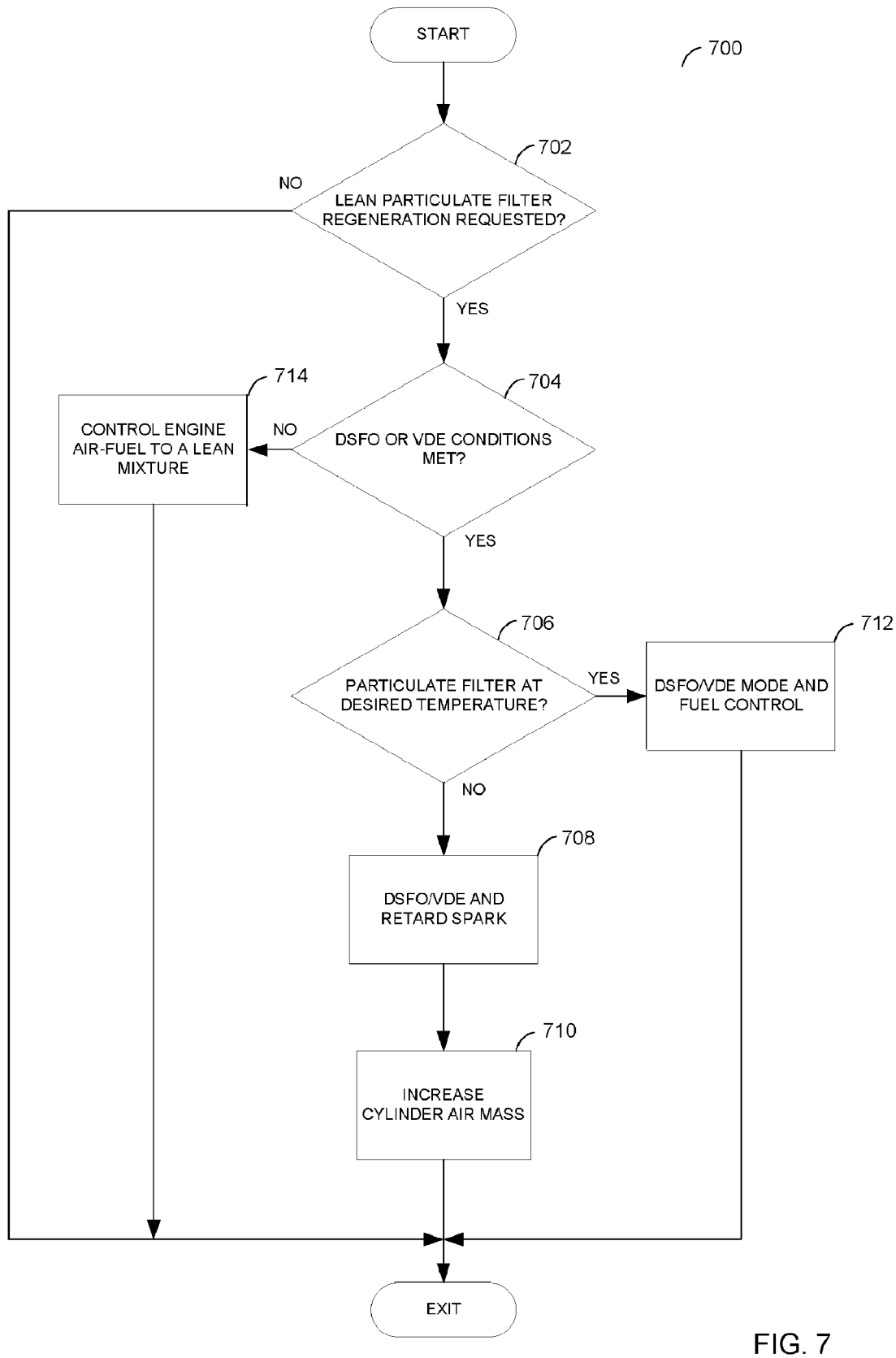
FIG. 7 shows a flow chart of a method for regenerating a particulate filter while operating a gasoline engine in a deceleration fuel cut-out mode or in a variable displacement mode.

Referring now to FIG. 7, a flow chart of a method for regenerating a particulate filter while operating a gasoline engine in a deceleration fuel cut-out (DSFO) mode or while in a variable displacement mode (VDE) is shown. During DSFO fuel to at least one cylinder is cut-out or reduced to a level where combustion is not possible with the lean fuel mixture. During VDE mode the number of active cylinders producing torque is less than the number of total engine cylinders. Lean mode VDE or DSFO may be initiated in one embodiment when the temperature of a particulate filter is greater than a threshold amount and when it is desirable to operate the engine cylinders lean, for example at 416 of FIG. 4 or at 510-514 of FIG. 5. Further, VDE mode may be entered when cylinder load is low and particulate filter temperature exceeds a threshold amount.

At 702, routine 700 judges whether or not lean particulate filter regeneration is requested or desired. If so, routine 700 proceeds to 704. If not, routine 700 proceeds to exit. During lean particulate filter regeneration, the particulate filter is regenerated by supplying excess oxygen to the particulate filter so that soot may be oxidized by the excess oxygen.

At 704, routine 700 judges whether or not conditions are met for VDE or DSFO particulate filter regeneration. In one example, the engine may be operating in a predetermined threshold engine speed/load range for VDE. DSFO particulate filter regeneration may be activated when the operator's foot is off the throttle and while the vehicle is above a threshold speed. If VDE or DSFO conditions are not met routine 700 proceeds to 714 where lean particulate filter regeneration may be accomplished by adjusting engine cylinder air-fuel ratios without deactivating engine cylinders. FIG. 8 provides details on particulate filter regeneration by this method. If DSFO or VDE lean mode particulate filter regeneration conditions are met routine 700 proceeds to 706.

At 706, routine 700 judges whether or not the particulate filter is at a desired temperature for regeneration. In one example, the particulate filter must be above a threshold temperature. The threshold temperature may be at or above the temperature at which soot will oxidize. If the particulate filter is above the threshold temperature, routine 700 proceeds to 712. If the particulate filter is not above the threshold temperature, routine 700 proceeds to 708.

At 708, engine spark is retarded from MBT or knock limited spark. In one example, the spark may be gradually retarded over a number of engine combustion events so that it is less apparent to a vehicle operator. The amount of spark retard may be empirically determined and stored in a table or function that is indexed by particulate filter temperature, engine speed, and engine load.

At 710, routine 700 increases cylinder air charge so that equivalent torque can be produced by the engine while spark is being retarded to heat the particulate filter. In one example, the amount of additional air is stored in a table indexed by spark retard from MBT, engine speed, and engine load. Thus, engine spark advance and engine cylinder air amount are simultaneously adjusted so that the engine will deliver the desired operator torque while increasing particulate filter temperature. Note that 708 and 710 may not retard spark and increase engine air amount unless engine load is below a threshold level that may be varied for different engine speeds.

At 712, engine cylinders may be deactivated to support VDE or DSFO modes. In one example, cylinders are deactivated in response to desired engine load and engine speed. While in VDE or DSFO the deactivated cylinders may provide oxygen to the particulate filter by pumping a lean air-fuel mixture through the engine and to the exhaust system. Alternatively, engine cylinders may pump intake system gases through the engine and to the particulate filter. While the deactivated cylinders are pumping oxygen to the particulate filter, active cylinders may operate with a rich air-fuel mixture and/or retarded spark timing. If a catalyst is located upstream of the particulate filter the rich cylinder mixture and the contents of the inactive cylinder may combine at an upstream catalyst to provide additional heat to increase the particulate filter temperature. In one embodiment, air-fuel mixtures combusted in active cylinders may be alternated between lean and rich mixtures. For example, a particular cylinder may combust a rich air-fuel mixture for one cylinder cycle and then combust a lean air-fuel mixture for one or more cylinder cycles. In this way, rich and lean air-fuel mixtures may be periodically cycled so that the particulate filter is exposed to excess oxygen while a downstream catalyst is maintained near stoichiometric conditions.

Referring now to FIG. 8, a flow chart of a method for operating a gasoline engine and regenerating a particulate filter is shown. The method allows near stoichiometric conditions to be maintained in a downstream catalyst.

At 802, routine 800 judges if particulate filter regeneration is complete. If so, routine 800 proceeds to exit. If not, routine 800 proceeds to 804. The method described at 516 of FIG. 5 may be used at 802 to determine if particulate filter regeneration is complete and has therefore been omitted for brevity. And, if the method of FIG. 8 is used at 510 and 512 of FIG. 5, 802 may be omitted as this function is performed at 516.

At 804, routine 800 determines the oxygen storage capacity of all catalysts in the exhaust system. In one example, the oxygen storage capacity may be determined as described above by cycling system catalysts between lean and rich conditions and observing the time that it takes the catalyst to change state. In another example, the oxygen storage capacity may be determined while cycling system catalysts between rich and lean states while recording the mass of oxygen delivered to catalyst (e.g., oxygen concentration multiplied by engine mass flow rate). In yet another embodiment, oxygen storage of each catalyst may be stored in a table indexed by catalyst temperature and modified by observations of switching times between oxygen sensors located upstream and downstream of catalysts.

At 806, the amount of soot held by the particulate filter is determined. As described above, the amount of soot may be determined by a pressure drop measured across the particulate trap. Or alternatively, the accumulated soot and soot oxidation rate may be determined from a model that describes the amount of soot produced by the engine (e.g., a table indexed by engine speed and load) and the soot oxidation rate (e.g., soot oxidation rate may be related to particulate filter temperature and to the amount of oxygen available in engine exhaust gases).

At 808, routine 800 determines the amount of oxygen stored in each catalyst of the system. As exhaust gases pass through an exhaust system, oxygen can be extracted from the gas and used to oxidize HC or CO at system catalysts or in the particulate filter; therefore, routine 800 keeps track of where oxygen is stored and used in the exhaust system. For example, in one embodiment, the mass of oxygen contained in engine feed gases is observed by an upstream oxygen sensor before the exhaust gases pass through a catalyst or particulate filter. As the exhaust gases pass through a catalyst or particulate filter a portion of the oxygen may be used to oxidize HC, CO, and soot. The amount of oxygen consumed from the exhaust gas can be estimated by multiplying the engine feed gas oxygen mass by a utilization factor for each catalyst or particulate filter. The utilization factor for each aftertreatment device may be adjusted based on temperatures and mass flow rates, for example. Oxygen that does not participate in oxidation and is not observed at a downstream oxygen sensor can be deemed to be stored in a catalyst. If an oxygen sensor detects an oxygen concentration that is not expected or inconsistent with an estimated amount of stored oxygen the oxygen storage capacity of each catalyst can be reset or adjusted. In this way, the amount of oxygen stored in each oxygen storage catalyst may be estimated.

At 810, routine 800 determines a particulate filter temperature. In one embodiment a temperature sensor may be used to determine particulate filter temperature. In another embodiment, particulate filter temperature may be estimated based on engine speed, engine load, engine spark advance, and engine air-fuel mixture. For example, a table of empirically determined exhaust temperatures may be stored and retrieved at a later time so that an engine controller can estimate particulate filter temperature.

At 812, routine 800 judges whether or not to increase a rate of soot oxidation. In one embodiment, a desired rate of soot oxidation may be based on the amount of soot held by a particulate filter and the engine load. For example, if the rate of desired soot oxidation is 0.1 mg/sec and the present rate of soot oxidation is 0.05 mg/sec the cylinder air-fuel ratio can be leaned by $0.01\lambda$ based on 50 mg of trapped soot. In another example, if the rate of desired soot oxidation is 0.1 mg/sec and the present rate of soot oxidation is 0.05 mg/sec the cylinder air-fuel ratio can be leaned by $0.05\lambda$ based on 20 mg of trapped soot. Thus, during a first condition a cylinder air-fuel may be adjusted to change the rate of soot oxidation in response to a first amount of soot held by a particulate filter, and during a second condition a cylinder air-fuel may be adjusted to change the rate of soot oxidation in response to a second amount of soot held by the particulate filter. If the estimated rate of soot oxidation is less than a desired oxidation rate, routine 800 proceeds to 814. If the estimated rate of soot oxidation is greater than a desired rate, routine 800 proceeds to 826.

At 814, routine 800 judges whether or not the engine cylinder air-fuel mixture is at a lean limit. If so, routine 800 proceeds to 818. Otherwise, routine 800 proceeds to 816 where the cylinder air-fuel mixture is leaned out. The engine or a cylinder may be gradually leaned out at 816 or it may be leaned out in a step wise manner to some predefined amount. For example, a small amount of oxygen may be delivered to the exhaust system by leaning a cylinder air-fuel mixture from $\lambda=1$ to $\lambda=1.01$. Over time (e.g., 5 seconds) and over a number of combustion events (e.g., 500 events), oxygen is slowly added to the exhaust system. On the other hand, the same amount of oxygen may be delivered to the exhaust system over a shorter time by leaning a cylinder to $\lambda=1.1$. The rate of leaning or fuel reduction of a cylinder may be related to the desired oxidation rate or the amount of soot held by the particulate filter. For example, a cylinder may be moved by $0.001\lambda$ per minute when a particulate filter is half full and at a rate of $0.002\lambda$ per minute when the particulate filter is full. Thus, under a first condition, fuel to a cylinder may be leaned at a first rate, and under a second condition fuel to a cylinder may be leaned at a second rate, the second rate different than the first rate.

At 818, routine 800 judges whether or not a downstream catalyst is at a lean limit. In the illustrated configurations of FIG. 2a-2c and FIG. 3, the downstream catalysts act as a buffer within which exhaust gas constituents are treated even though excess oxygen is provided to the particulate filter and upstream catalysts. However, it is desirable to keep the downstream catalysts above a threshold temperature and in a state where between 20%-80% (preferably between 40-60%) of the oxygen storage capacity of the catalyst oxygen storage capacity is utilized. If the catalyst temperature falls below the threshold temperature, or if excess oxygen is stored in the catalyst tailpipe emissions of HC, CO, and NOx may increase. Therefore, routine 800 judges if the downstream catalyst is at the lean limit based on the amount of oxygen capacity of the downstream catalyst as well as the amount of oxygen stored in the catalyst. If the amount of oxygen stored exceeds a threshold amount, routine 800 proceeds to 820. Otherwise, routine 800 proceeds to 824.

At 820, routine 800 ramps engine fuel rich even though a higher rate of oxidation may be desired. Routine 800 ramps rich so that a downstream catalyst may continue to operate efficiently, the fuel is ramped rich until the downstream catalyst is at the rich limit and then lean operation for particulate filter soot reduction may be resumed. When the engine expels products of lean combustion, a portion of the oxygen in the exhaust gases is consumed by oxidizing soot held by the particulate filter. Therefore, the engine can operate lean for an extended period since less oxygen will enter the downstream catalyst.

At 824, routine 800 judges whether or not a downstream catalyst is at a rich limit. As mentioned above, it is desirable to keep the downstream catalyst in a state where between 20%-80% (preferably between 40%-60%) of the catalyst oxygen storage capacity is utilized. In this state, the catalyst retains constituents for oxidizing and reducing exhaust gases. Therefore, routine 800 judges if the downstream catalyst is at the rich limit based on the amount of oxygen capacity of the downstream catalyst as well as the amount of oxygen stored in the catalyst. If the amount of oxygen stored in the downstream catalyst is less than a threshold amount, routine 800 proceeds to 822. Otherwise, routine 800 proceeds to 802.

At 822, routine 800 ramps engine fuel lean. Routine 800 ramps lean so that a downstream catalyst may continue to operate efficiently. In one example, the fuel is ramped lean until the desired level of oxygen is stored in the downstream catalyst is reached. During lean operation the fuel may be ramped until a desired air-fuel mixture in the cylinder is reached, then the engine may continue to operate at the lean air-fuel mixture until the downstream catalyst reaches the desired storage level of oxygen.

At 826, routine 800 judges whether or not to decrease particulate filter oxidation by richening the engine cylinder air-fuel ratio. As described above, in one embodiment, a desired rate of soot oxidation may be based on the amount of soot held by a particulate filter and the engine load. For example, if the rate of desired soot oxidation is 0.05 mg/sec and the present rate of soot oxidation is 0.1 mg/sec the cylinder air-fuel ratio can be richened by $0.02\lambda$ based on 5 mg of trapped soot. In another example, if the rate of desired soot oxidation is 0.05 mg/sec and the present rate of soot oxidation is 0.15 mg/sec the cylinder air-fuel ratio can be richened by $0.05\lambda$ based on 2 mg of trapped soot. Thus, during a first condition a cylinder air-fuel may be adjusted to change the rate of soot oxidation in response to a first amount of soot held by a particulate filter, and during a second condition a cylinder air-fuel may be adjusted to change the rate of soot oxidation in response to a second amount of soot held by the particulate filter. If the estimated rate of soot oxidation is greater than a desired oxidation rate, routine 800 proceeds to 828. Otherwise, routine 800 proceeds to 818.

At 828, routine 800 judges whether or not the engine cylinder air-fuel mixture is at a rich limit. If so, routine 800 proceeds to 818. Otherwise, routine 800 proceeds to 830 where the cylinder air-fuel mixture is richened. The engine or a cylinder may be gradually richened at 830 or it may be richened in a step wise manner to some predefined amount. For example, a small amount of oxygen may be extracted from exhaust gases by richening a cylinder air-fuel mixture from $\lambda=1$ to $\lambda=0.98$. Over time (e.g., 5 seconds) and over a number of combustion events (e.g., 500 events), oxygen is slowly extracted from exhaust gases. On the other hand, the same amount of oxygen may extracted from exhaust gases over a shorter time by richening a cylinder to $\lambda=0.9$.

At 830, the engine cylinder air-fuel mixture is richened. The engine or a cylinder may be gradually richened at 830 or it may be richened in a step wise manner to some predefined amount. For example, a small amount of oxygen may be removed from exhaust gases by richening a cylinder air-fuel mixture from $\lambda=1$ to $\lambda=0.98$. Over time (e.g., 5 seconds) and over a number of combustion events (e.g., 500 events), oxygen is removed from the aftertreatment devices because the stored oxygen is used to oxidize increasing HC and CO. On the other hand, the same amount of oxygen may be removed from aftertreatment devices over a shorter time by richening a cylinder to $\lambda=0.9$. The rate of richening of a cylinder may be related to the desired oxidation rate or the amount of soot held by the particulate filter similar to that which is described at 816.

In this way, the method of FIG. 8 adjusts a cylinder air-fuel during regeneration of a particulate filter such that the average or integrated air-fuel mixture over a number of cylinder cycles moves leaner. At the same time, the concentration of oxygen in exhaust gases downstream of the particulate filter are reduced such that the average or integrated exhaust gas mixture over a number of cylinder cycles is as substantially stoichiometric conditions.

It should be noted that all of routines 4-8 may be executed by a single controller, or alternatively, an engine controller may execute only a portion of methods 4-8. Thus, the routines 4-8 may be employed for various system configurations.

Referring now to FIG. 9, example plot of cylinder air-fuel adjustments and exhaust gas oxygen concentration downstream of a particulate filter is shown. The top plot shows an example air-fuel ratio of a cylinder over a number of cylinder cycles. The air-fuel oscillates about an x-axis that represents a stoichiometric air-fuel ratio. Time increases from left to right. Before T1 the cylinder air-fuel ratio is symmetric about stoichiometry and the particulate filter is not being regenerated. Between T1 and T2 particulate filter regeneration commences and the cylinder air-fuel ratio is shifted lean to account for oxygen that participates in the combustion of soot in a particulate filter. Notice that the entire oscillating air-fuel ratio is shifted lean. Between T2 and T3 the cylinder air-fuel ratio is shifted even further lean to further increase the rate of oxidation in the particulate filter. The rich side of the air-fuel mixture also increases in an extent of richness or leanness of an air-fuel mixture entering a cylinder in order to keep the rear three-way catalyst balanced and operating efficiently. After T3 the cylinder air-fuel ratio is shift richer and is again symmetric about stoichiometry when soot oxidation has completed.

It should be noted that the air-fuel depicted in FIG. 9 is merely provided for illustration purposes and is not intended to limit the description in any way. For example, engine air-fuel may be controlled by a triangular air-fuel distribution or by a stochastic distribution about stoichiometric conditions. In addition, the duration of air-fuel richness or leanness as well as the extent of air-fuel leanness or richness may be adjusted to keep a downstream three-way catalyst balanced to stoichiometric conditions.

The bottom plot illustrates oxygen concentration in the exhaust system at a location downstream of the particulate filter. Notice that the oxygen concentration stays symmetric about stoichiometry when the cylinder air-fuel is shifted lean when soot is oxidized during particulate filter regeneration. As lean exhaust gases pass through the particulate filter between T1 and T3, oxygen participates in the oxidation of soot to CO and/or $CO_2$. The partial oxidation of soot to CO may provide a reductant for NOx reduction. As a result, the oxygen concentration exiting the particulate filter is symmetric about stoichiometric conditions. Consequently, stoichiometric conditions are maintained in a downstream catalyst. In this way, a particulate filter upstream can be regenerated while maintaining stoichiometric conditions in a downstream catalyst. Thus, a downstream catalyst can efficiently convert exhaust gases while oxidizing soot in the particulate filter.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for processing particulate matter of a gasoline engine having an exhaust system, comprising:
   a device including at least a first three-way catalyst and a particulate filter, said device being an aftertreatment device located farthest upstream in said exhaust system as compared to all other aftertreatment devices in said exhaust system;
   a second three-way catalyst disposed in said exhaust system downstream of said device; and
   a controller, said controller substantially depleting an amount of oxygen in said first three-way catalyst before increasing a rate of oxidation of soot held by said particulate filter, said amount of oxygen depleted in response to an amount of soot held by said particulate filter exceeding a threshold.

2. The system of claim 1, further comprising said controller adjusting an air-fuel ratio of said gasoline engine during particulate filter regeneration so that exhaust gases flowing from the particulate filter are at stoichiometric conditions.

3. The system of claim 1, wherein said controller substantially depletes said amount of oxygen in said first three-way catalyst by enriching an air-fuel mixture of at least one cylinder of said gasoline engine.

4. The system of claim 3, wherein said at least one cylinder is a cylinder that is active during deceleration fuel shut-off or said at least one cylinder is a cylinder that is active during a variable displacement mode.

5. The system of claim 3, wherein said controller increases oxygen flow to said first three-way catalyst and to said particulate filter after substantially depleting said amount of oxygen by providing a lean air-fuel mixture to the at least one cylinder of said gasoline engine.

6. The system of claim 1, wherein the controller provides a lean air-fuel mixture after depleting the amount of oxygen in said first three-way catalyst until a threshold amount of oxygen is present in exhaust gases passing through said device.

7. The system of claim 1, wherein the controller increases a temperature of said particulate filter by retarding spark to said gasoline engine and by increasing air flow to said gasoline engine as part of a procedure to regenerate said particulate filter.

8. The system of claim 7, wherein said controller adjusts fuel delivered to said gasoline engine in response to a first oxygen sensor located upstream of said first three-way catalyst and in response to a second oxygen sensor located downstream of said particulate filter.

9. The system of claim 8, wherein said controller further adjusts said fuel delivered to said gasoline engine in response to a model that estimates the amount of stored soot and the rate of oxidation for said particulate filter.

10. A method for processing particulate matter of a gasoline engine, comprising:
    directing exhaust gases from said gasoline engine to a first three-way catalyst combined with a particulate filter and disposed in an exhaust system; and
    adjusting fuel delivered to said gasoline engine in response to an oxygen concentration in said exhaust system at a location upstream of said first three-way catalyst and upstream of a second three-way catalyst, the fuel delivered to said gasoline engine adjusted such that exhaust gas flowing from the particulate filter varies between rich and lean of stoichiometric conditions during particulate filter regeneration.

11. The method of claim 10, wherein said adjusting fuel delivered to said gasoline engine comprises richening an air-fuel mixture delivered to said gasoline engine when a temperature of said particulate filter exceeds a threshold and when an amount of soot held by said particulate filter exceeds a threshold amount, and leaning said air-fuel mixture delivered to said gasoline engine when said oxygen concentration in said exhaust system is less than a threshold amount in said exhaust system at a location downstream of said first three-way catalyst and upstream of said second three-way catalyst.

12. The method of claim 10, wherein said fuel delivered to said gasoline engine is enriched by increasing an amount of fuel injected to at least one cylinder during an engine operating condition where the particulate filter is being regenerated as compared to an amount of fuel injected to said at least one cylinder during a similar operating condition where said particulate filter is not being regenerated.

13. The method of claim 10, wherein said adjusting fuel delivered to said gasoline engine comprises leaning an air-fuel mixture delivered to said gasoline engine when a temperature of said particulate filter exceeds a threshold and when an amount of soot held by said particulate filter exceeds a first threshold amount, and richening said air-fuel mixture delivered to said gasoline engine when said oxygen concentration in said exhaust system is greater than a second threshold amount in said exhaust system at a location downstream of said first three-way catalyst and upstream of said second three-way catalyst.

14. The method of claim 10, wherein said adjusting fuel delivered to said gasoline engine further comprises adjusting said fuel delivered to said gasoline engine in response to an oxygen concentration at a location downstream of said second three-way catalyst.

15. The method of claim 10, wherein spark delivery to said gasoline engine is retarded from base timing before said adjusting fuel delivered to said gasoline engine, and said adjusting fuel delivered to said gasoline engine comprises alternating between richening and leaning an air-fuel mixture delivered to said gasoline engine in response to said oxygen concentration in said exhaust system at a location downstream of said first three-way catalyst and upstream of said second three-way catalyst, wherein said air-fuel mixture is richened or leaned by extending an amount of combustion events that at least one cylinder of said gasoline engine operates with a lean or rich air-fuel mixture.

16. A system for processing particulate matter of a gasoline engine having an exhaust system, comprising:
    a first three-way catalyst disposed in said exhaust system;
    a particulate filter disposed in said exhaust system at a location downstream of said first three-way catalyst;
    a second three-way catalyst disposed in said exhaust system downstream of said particulate filter; and
    a controller that adjusts fuel delivered to said gasoline engine in response to an oxygen concentration in said exhaust system at a location upstream of said first three-way catalyst and in response to an oxygen concentration in said exhaust system at a location downstream of said particulate filter to provide exhaust gases that vary between rich and lean of stoichiometric conditions.

17. The system of claim 16, wherein said controller further adjusts fuel delivered to said gasoline engine by leaning or richening an air-fuel mixture of at least one cylinder of said gasoline engine when an amount of soot held by said particulate filter exceeds a threshold amount and when a temperature of said particulate filter exceeds a threshold amount.

18. The system of claim 16, wherein an oxygen storage capacity of said first three-way catalyst is less than half an oxygen storage capacity of said second three-way catalyst.

19. The system of claim 16, wherein said controller further adjusts said fuel delivered to said gasoline engine to adjust an oxidation rate of soot held by said particulate filter, said oxidation rate increased by increasing a number of combustion events that at least one cylinder operates lean.

20. The system of claim 16, wherein an extent of leanness or richness of an air-fuel mixture of at least one cylinder is varied from rich to lean in relation to a desired rate of oxidation of soot held in said particulate filter.

21. The system of claim 19, wherein the number of combustion events said at least one cylinder is operated lean is related to a desired rate of oxidation of soot held by said particulate filter.

22. The system of claim 16, wherein a duty cycle between rich and lean air-fuel mixtures combusted by at least one cylinder is related to a desired rate of oxidation of soot held by said particulate filter.

23. A method for processing particulate matter of a gasoline engine, comprising:
   directing exhaust gases from said gasoline engine to a first three-way catalyst;
   directing exhaust gases from said first three-way catalyst to a particulate filter;
   directing exhaust gases from said particulate filter to a second three-way catalyst; and
   adjusting fuel delivered to said gasoline engine such that said first three-way catalyst and said second three-way catalyst are operated at substantially stoichiometric conditions when an amount of soot held by said particulate filter is less than a threshold; and
   adjusting fuel delivered to said gasoline engine such that said first three-way catalyst is operated rich and lean about stoichiometric conditions while said second three-way catalyst is operated rich and lean about stoichiometric conditions when the amount of soot held by said particulate filter is greater than said threshold.

24. The method of claim 23, wherein an air-fuel mixture produced by said fuel delivered to at least one cylinder of said gasoline engine is leaned when the amount of soot held by said particulate filter exceeds the threshold.

25. The method of claim 23, wherein said fuel delivered to said gasoline engine is varied from rich to lean in relation to a desired rate of oxidation of soot held in said particulate filter.

26. The method of claim 23, wherein an amplitude between rich and lean air-fuel ratio mixtures that are delivered to said gasoline engine is related to a desired rate of oxidation of soot held in said particulate filter.

* * * * *